US012227254B2

(12) United States Patent
Dorman et al.

(10) Patent No.: US 12,227,254 B2
(45) Date of Patent: Feb. 18, 2025

(54) POWERED TWO-WHEEL VEHICLE

(71) Applicant: Intellectual Property Holdings, LLC, Cleveland, OH (US)

(72) Inventors: Andrew Dorman, Brecksville, OH (US); Dan T. Moore, Cleveland Heights, OH (US); Jake Schurr, Fairview Park, OH (US); Mohammad Al-Raie, Strongsville, OH (US); Ryan G. Sarkisian, Lakewood, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 0 days.

(21) Appl. No.: 18/405,520

(22) Filed: Jan. 5, 2024

(65) Prior Publication Data
US 2024/0227965 A1 Jul. 11, 2024

Related U.S. Application Data

(60) Provisional application No. 63/437,487, filed on Jan. 6, 2023.

(51) Int. Cl.
*B62J 43/10* (2020.01)
*B62K 21/08* (2006.01)
(Continued)

(52) U.S. Cl.
CPC ............. *B62J 43/10* (2020.02); *B62K 21/08* (2013.01); *B62K 21/18* (2013.01); *B62K 23/02* (2013.01); *B62K 2202/00* (2013.01)

(58) Field of Classification Search
CPC ........ B62J 43/10; B62J 45/411; B62J 45/412; B62J 43/28; B62K 21/08; B62K 21/18;
(Continued)

(56) References Cited

U.S. PATENT DOCUMENTS 4,093,252 A 6/1978 Rue
4,394,029 A 7/1983 Holmgren
(Continued)

FOREIGN PATENT DOCUMENTS

DE 202011109151 U1 9/2012
DE 202019101294 U1 4/2019
(Continued)

OTHER PUBLICATIONS

Invitation to Pay Additional Fees, Partial Search Report, and Provisional Opinion from PCT/US2024/010476 dated Jun. 14, 2024.
(Continued)

*Primary Examiner* — Kevin Hurley
*Assistant Examiner* — Marlon A Arce
(74) *Attorney, Agent, or Firm* — Calfee, Halter & Griswold LLP

(57) ABSTRACT

A powered two-wheel vehicle includes a chassis extending between a rotatable front fork and a fixed rear fork. A deck is attached to the chassis to enclose a compartment. A front wheel is rotatably attached to the front fork and a rear wheel is rotatably attached to the rear fork via a hub motor. The steering assembly includes a head tube supported above and in front of the deck by a pair of arched frame tubes, a steering tube rotatably connected to the head tube, and a rotational damper connected between the head tube and the steering tube.

20 Claims, 11 Drawing Sheets

(51) Int. Cl.
*B62K 21/18* (2006.01)
*B62K 23/02* (2006.01)

(58) Field of Classification Search
CPC .......................... B62K 23/02; B62K 2202/00; B62K 2204/00; B62K 3/002; A63C 17/0033; A63C 17/016; A63C 17/12; B62H 5/00; B62M 6/45; B62M 6/65
See application file for complete search history.

(56) References Cited

U.S. PATENT DOCUMENTS

| | | |
|---|---|---|
| 5,160,155 A | 11/1992 | Barachet |
| 5,347,681 A | 9/1994 | Wattron et al. |
| 6,318,522 B1 * | 11/2001 | Johnston ................. F16F 9/145 |
| | | 192/208 |
| 6,488,295 B1 | 12/2002 | Bryant |
| 7,891,680 B2 | 2/2011 | Chen et al. |
| 8,708,354 B2 | 4/2014 | Young |
| 8,939,454 B2 | 1/2015 | Stillinger et al. |
| 9,233,701 B2 | 1/2016 | Glover |
| 9,682,309 B2 | 6/2017 | Huang |
| 10,099,741 B2 | 10/2018 | Chen |
| 2005/0230930 A1 | 10/2005 | Chung |
| 2010/0289237 A1 | 11/2010 | Smith |
| 2013/0001909 A1 | 1/2013 | Stillinger et al. |
| 2014/0167376 A1 | 6/2014 | Glover |
| 2014/0249720 A1 * | 9/2014 | Sintorn ................. F16F 9/125 |
| | | 701/41 |
| 2024/0226706 A1 * | 7/2024 | Marabese ............ A63C 17/016 |

FOREIGN PATENT DOCUMENTS

| | | |
|---|---|---|
| GB | 256033 A | 8/1926 |
| WO | 2012071595 A1 | 6/2012 |
| WO | 2019231433 A1 | 12/2019 |
| WO | 2022263783 A1 | 12/2022 |

OTHER PUBLICATIONS

Curvway, "Curvway invents the all-terrain electric surfboard," downloaded from https://www.curvway.com on Jul. 26, 2023, 8 pages.
International Search Report and Written Opinion from PCT/US2024/010476 dated Aug. 12, 2024.

* cited by examiner

POWERED TWO-WHEEL VEHICLE

CROSS-REFERENCE TO RELATED APPLICATIONS

The present application claims the benefit of U.S. Provisional Application Ser. No. 63/437,487, filed on Jan. 6, 2023, entitled POWERED TWO-WHEEL VEHICLE, the entire disclosure of which is incorporated herein by reference in its entirety.

TECHNICAL FIELD

The present application relates generally to powered mobility devices and in particular to two-wheeled, electrically powered boards.

BACKGROUND

With the variable price of gasoline along with the current public perception of internal combustion engines and their emissions' negative impact on the environment, there is a growing need in the market for an alternative mode of transportation. In densely populated urban areas, highly congested city streets have led many to use non-motorized modes of transportation that have a smaller footprint, such as a bike or skateboard. Using these smaller, manually powered vehicles allows a rider to avoid the traffic of the main roadway but requires physical exertion unlike a traditional motorized vehicle. These traditional vehicles can be limited in other ways as well, for example, skateboards require a smooth surface to work safely and effectively, can be difficult to learn to maneuver, and can be unstable at higher speeds. As such, there is a need for a motorized mobility device that is compact and lightweight, easy to learn, and stable at higher speeds achieved by a motorized vehicle.

SUMMARY

Exemplary embodiments of two-wheeled powered vehicles and methods of using the same are disclosed herein.

An example of a powered two-wheel vehicle includes a chassis, a deck, a front wheel, a rear wheel, and a steering assembly. The chassis extends between a rotatable front fork and a fixed rear fork. The deck is removably attached to the chassis, wherein attaching the deck to the chassis encloses a compartment. The front wheel is rotatably attached to the rotatable front fork. The rear wheel is rotatably attached to the fixed rear fork via a hub motor, wherein the hub motor provides motive power to the rear wheel. The steering assembly includes a head tube, a steering tube, and a rotational damper. The head tube is attached to the chassis and supported above and in front of the deck by a pair of arched frame tubes, wherein the head tube is tilted forward at a rake angle. The steering tube is rotatably connected to the head tube, wherein the steering tube extends into the head tube from the rotatable front fork so that the rotatable front fork trails the head tube when the powered two-wheel vehicle moves in a forward direction and the front wheel is in contact with a ground surface. The rotational damper is connected between the head tube and the steering tube.

An example of a powered two-wheel vehicle includes a chassis, a deck, a front wheel, a rear wheel, and a steering assembly. The chassis extends between a rotatable front fork and a fixed rear fork. The deck is removably attached to the chassis, wherein attaching the deck to the chassis encloses a compartment. The front wheel is rotatably attached to the rotatable front fork. The rear wheel is rotatably attached to the fixed rear fork via a hub motor, wherein the hub motor provides motive power to the rear wheel. The steering assembly includes a head tube, a steering tube, and a rotational damper. The head tube is attached to the chassis and supported above and in front of the deck by a pair of arched frame tubes, wherein the head tube is tilted forward at a rake angle. The steering tube is rotatably connected to the head tube, wherein the steering tube extends into the head tube from the rotatable front fork so that the rotatable front fork trails the head tube when the powered two-wheel vehicle moves in a forward direction and the front wheel is in contact with a ground surface. The rotational damper is connected between the head tube and the steering tube. The powered two-wheel vehicle also includes a battery and a control system disposed in the compartment. The battery provides electrical power to the hub motor and the control system. The powered two-wheel vehicle also includes a user input device for transmitting user input signals to the control system. The user input device includes a plurality of control elements for controlling the operation of the powered two-wheel vehicle.

An example method of controlling a powered two-wheel vehicle includes steps of: receiving a user input signal from a user input device at a control system, receiving a selected operating mode and vehicle performance data at the control system, generating a motor control signal, and operating a motor based on the motor control signal. The user input signal includes an acceleration instruction or a deceleration instruction. The motor control signal is generated based on the user input signal, the vehicle performance data, and the selected operating mode.

A further understanding of the nature and advantages of the present invention are set forth in the following description and claims, particularly when considered in conjunction with the accompanying drawings in which like parts bear like reference numerals.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which.

DETAILED DESCRIPTION

Figure 1:
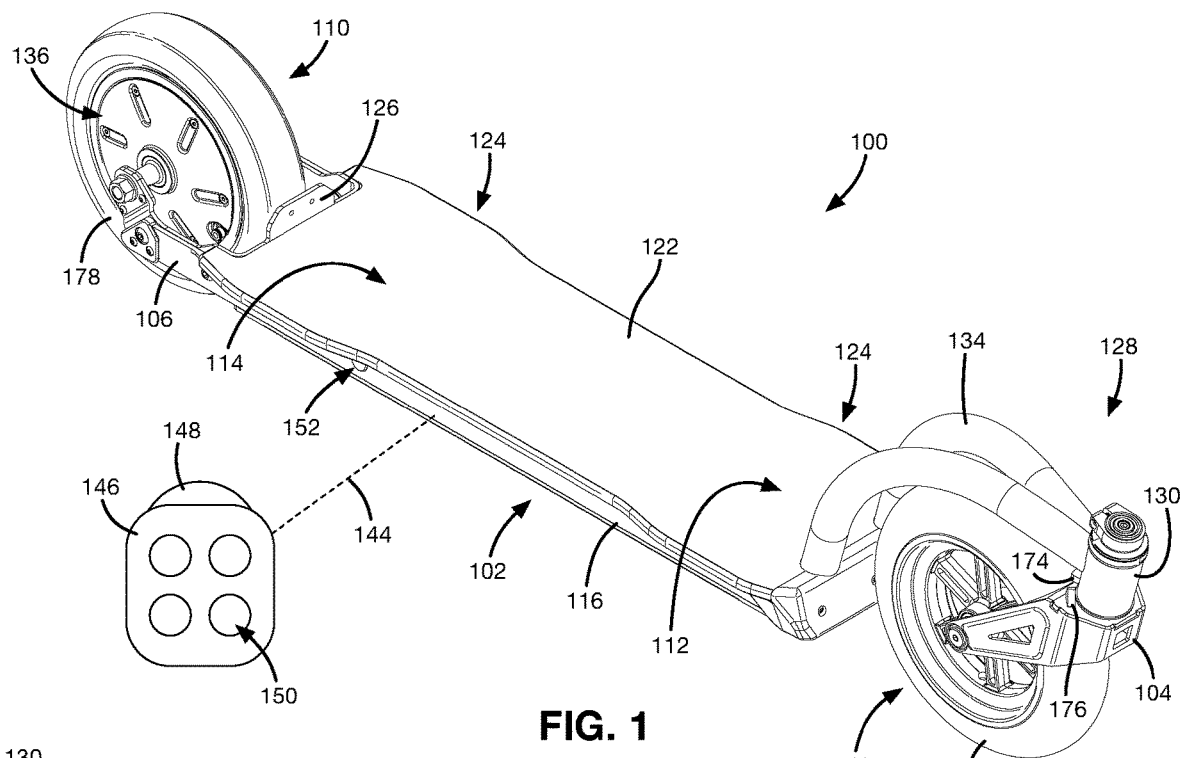
FIG. 1 shows a top perspective view of a powered two-wheel vehicle.
Figure 2:
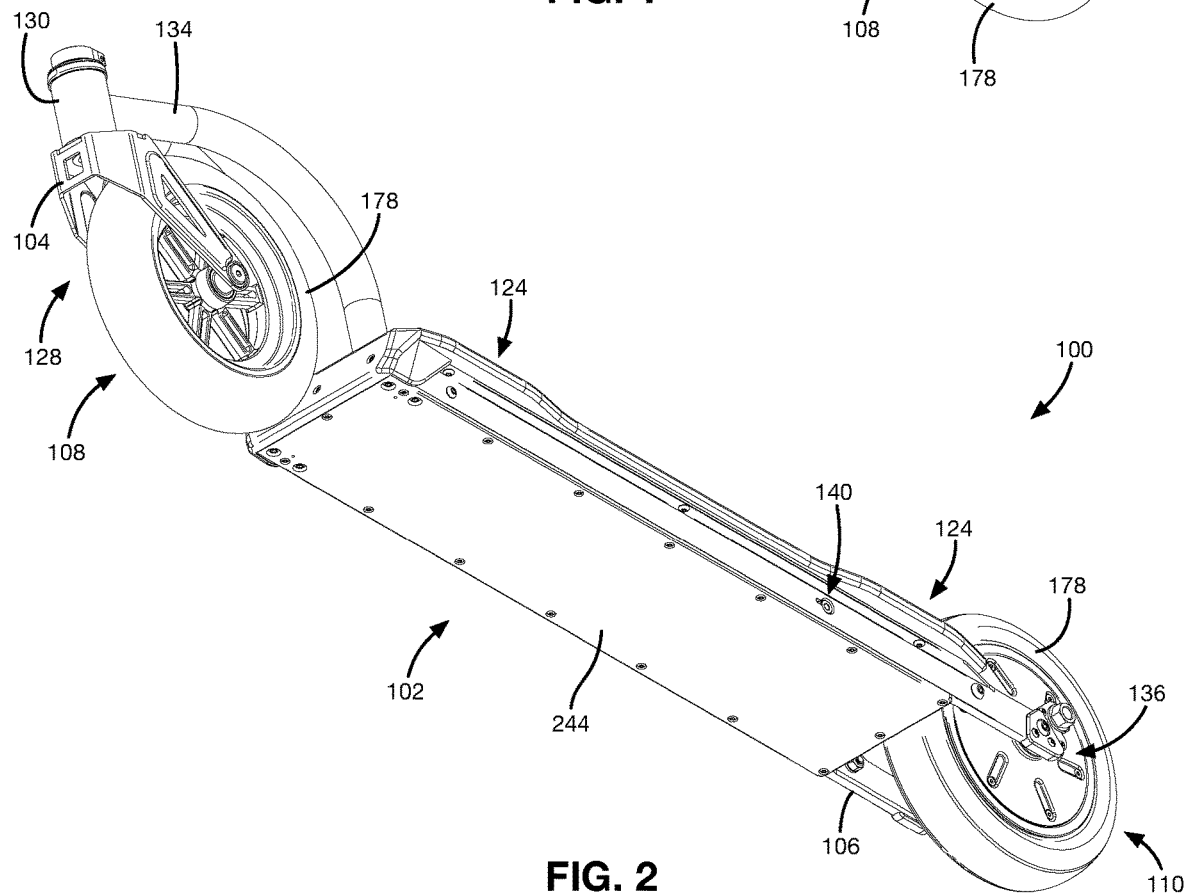
FIG. 2 shows a bottom perspective view thereof.
Figure 3:
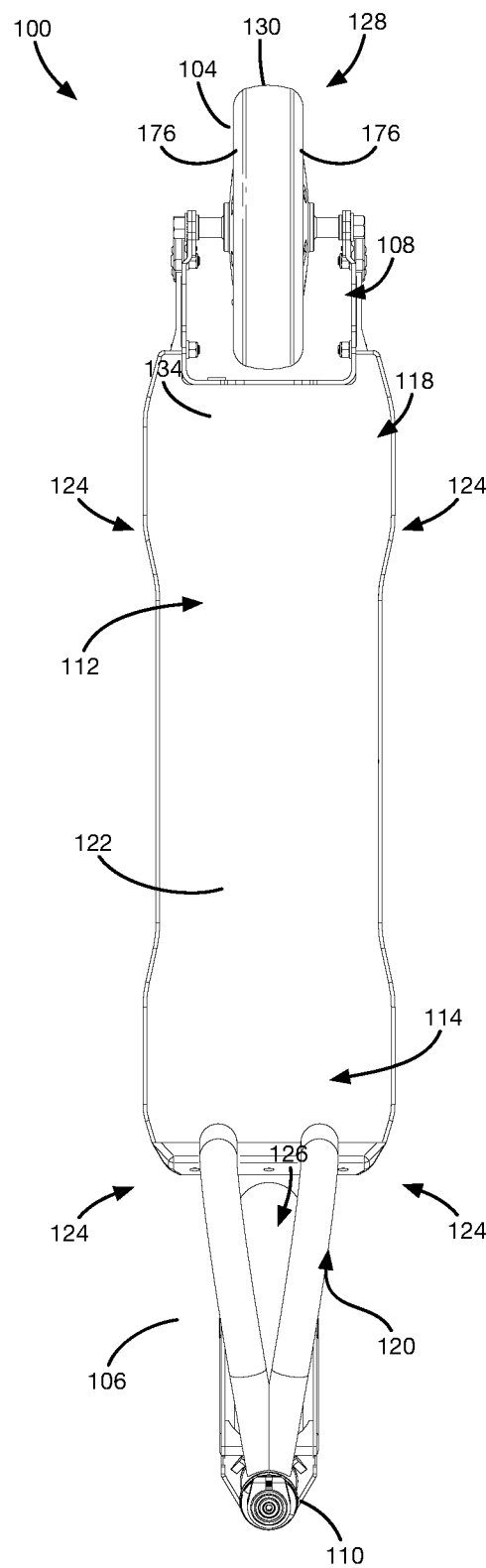
FIG. 3 shows a top view thereof.
Figure 4:
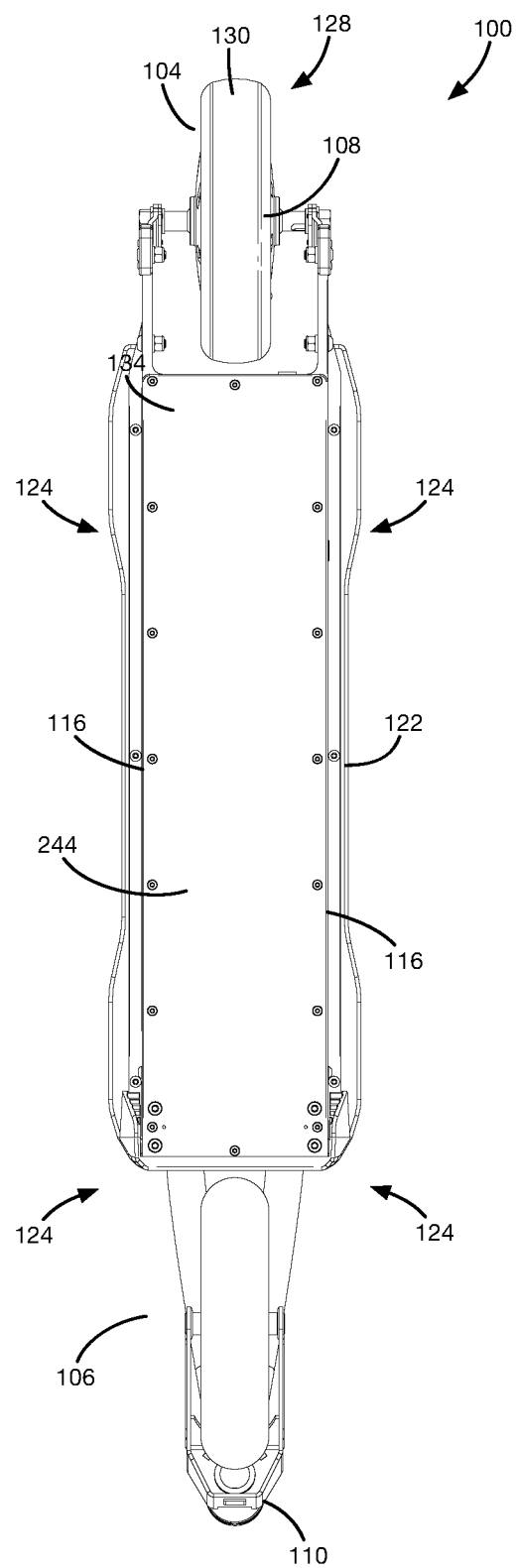
FIG. 4 shows a bottom view thereof.
Figure 5:
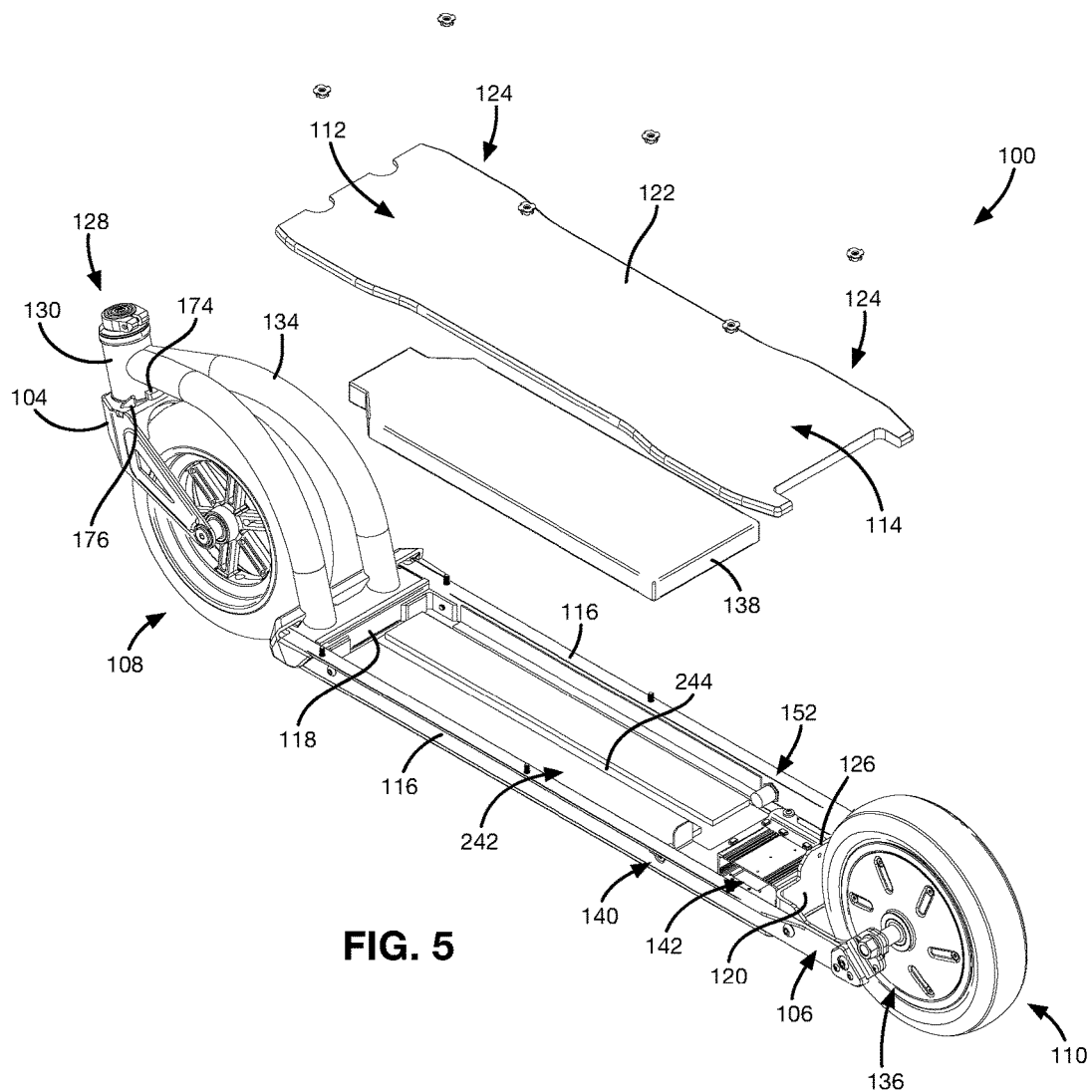
FIG. 5 shows an exploded view thereof.
Figure 6:
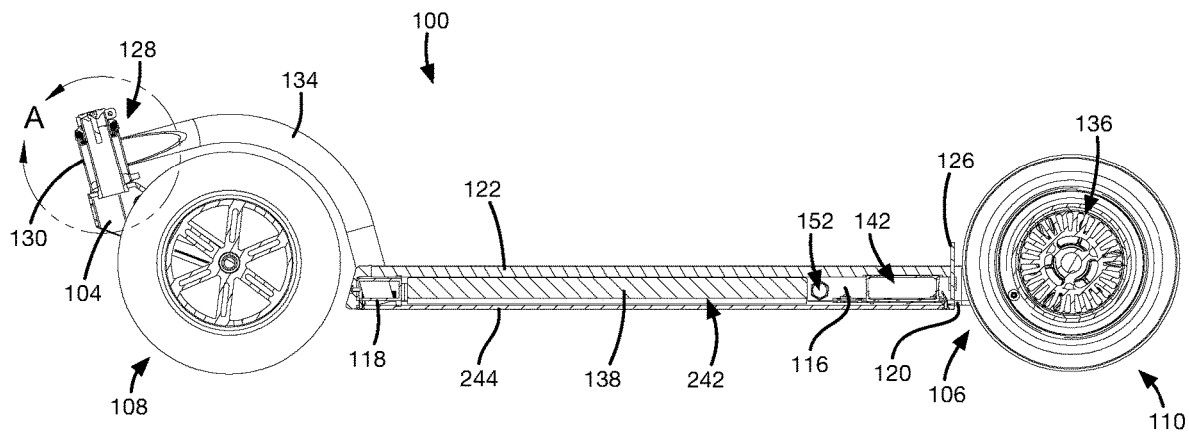
FIG. 6 shows a cross-sectional view thereof, taken along a midplane of the powered two-wheel vehicle.
Figure 7:
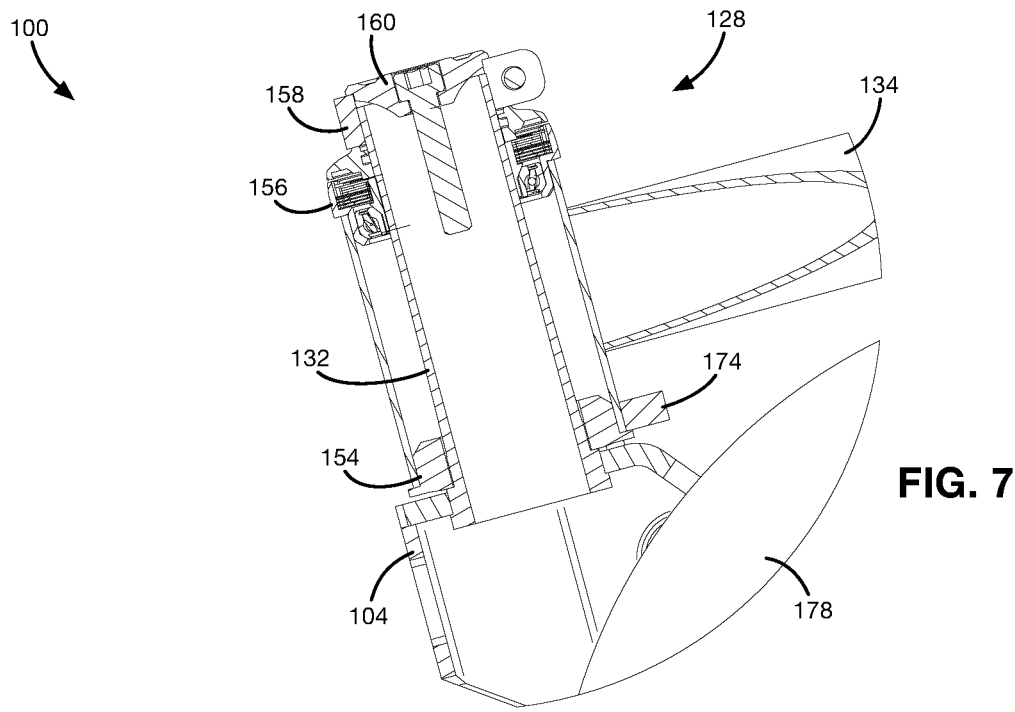
FIG. 7 shows an enlarged view of area A of FIG. 6.
Figure 8:
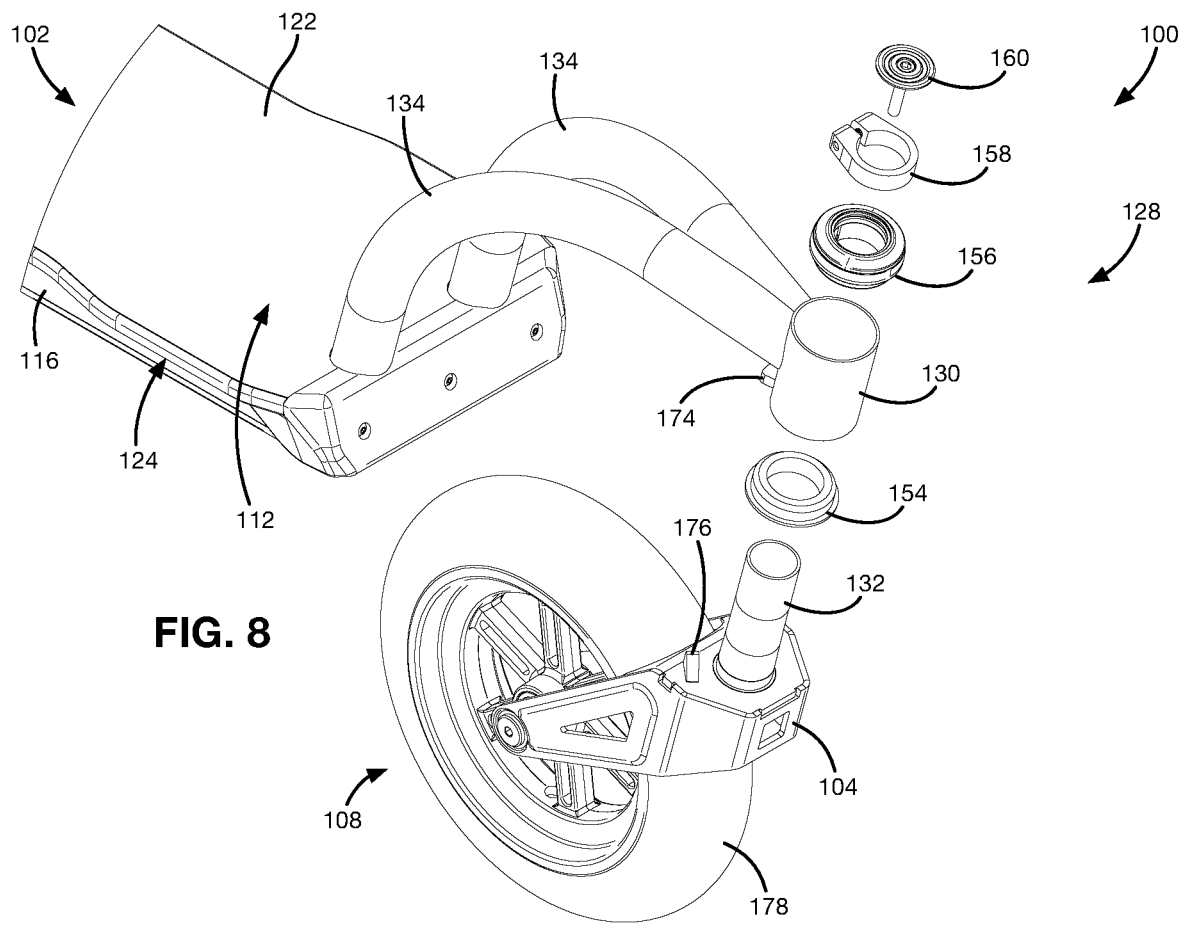
FIG. 8 shows an exploded view of a steering assembly of the powered two-wheel vehicle of FIG. 1.

The following description refers to the accompanying drawings, which illustrate specific embodiments of the present disclosure. Other embodiments having different structures and operation do not depart from the scope of the present disclosure.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Additionally, as used herein, the term "exemplary" is intended to mean serving as an illustration or example of something and is not intended to indicate a preference.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; and X employs both A and B. In addition, the articles "a" and "an" as used in this application and the appended claims should generally be construed to mean "one or more" unless specified otherwise or clear from the context to be directed to a singular form.

Numerical values or ranges stated herein are understood to encompass values at or near the stated value and/or above or below the stated range. For this application, the stated value can encompass plus or minus 5% of the value and the stated range can encompass plus or minus 5% of the extent of the range. In addition, the stated value or range can include a margin of error for the value or range typical in the art for the property being measured. The stated value or range can also encompass those values and ranges that would be considered equivalent to the stated value or range by one of ordinary skill in the art. As an example, a voltage expressed as a range of 10 volts to 100 volts is understood to include durations above and below the ends of the range by 5% of the extent of the 90-volt range—e.g., 6.5 volts to 104.5 volts. As another example, the size of an object expressed as a value of 2 inches includes values above and below 2 inches that are within the margin of error of a tool typically used to measure objects of that size. As yet another example, an angle between two components expressed as a value of 20 degrees includes values above and below 20 degrees that would be considered equivalent by one of ordinary skill in the art.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Since their introduction in the early 1960s, skateboards have garnered a strong following and culture unique from other forms of personal transportation. While a typical skateboard that has four wheels on two axels attached to the bottom of the board or deck can be used for transportation, the maneuverability of the four-wheel layout is limited in that the four wheels discourage sharp turns. Riders get around this limitation by performing various tricks that lift one or more wheels off of the ground. Learning how to perform these maneuvers requires an amount of practice and possibility of injury that dissuades the average pedestrian from using a skateboard for a daily commute.

While skateboards and other small, manually powered vehicles such as scooters, skates, and bicycles allow a pedestrian to avoid the traffic of the main roadway, the physical exertion required by these devices can dissuade one from using such a device to commute to work or to travel between errands. Reducing the physical exertion required to ride, for example a skateboard, can be done by the addition of a motor to drive one or more of the wheels of the skateboard. The small, hard wheels and shorter wheelbase of the skateboard, however, results in reduced stability as the rider increases in speed and limits the use of the skateboard to paved surfaces. The powered two-wheel vehicle described herein provides improved maneuverability—riding more like a surfboard or snowboard—and better stability at higher speeds than a typical skateboard. An example of a powered two-wheel vehicle described herein has a tighter turning radius than a typical skateboard at low speeds, is stable at higher speeds, and can traverse unpaved paths, lawns, and other rough terrain. Importantly, the stability of the powered two-wheel vehicles described herein helps new riders quickly learn how to control the vehicle, thereby facilitating increased adoption in the marketplace. An optional training post can also be added to the powered two-wheel vehicle described herein to provide a new rider with an added sense of security when first stepping onto the powered two-wheel vehicle.

Referring now to FIGS. 1-10, an example of a powered two-wheel vehicle 100 is shown. The powered two-wheel vehicle 100 includes a chassis 102 that extends between a rotatable front fork 104 and a fixed rear fork 106. A front wheel 108 is rotatably attached to the rotatable front fork 104 and a rear wheel 110 is rotatably attached to the fixed rear fork 106. The front wheel 108 and the rear wheel 110 are arranged inline and each have a diameter ranging from 5 inches to 17 inches, or from 6 inches to 15 inches, or from 7 inches to 13 inches, or from 8 inches to 11 inches, or 9.5 inches. In some powered two-wheel vehicles, the front and rear wheels 108, 110 have the same diameter such that a rotational center of each wheel 108, 110 is the same height above the ground. In some powered two-wheel vehicles, the front wheel 108 and the rear wheel 110 have different diameters—i.e., the front wheel 108 can have a larger diameter than the rear wheel, and vice versa.

The inline arrangement of the wheels 108, 110 allows the rider to turn with a tighter turning radius than a vehicle with four wheels, providing enhanced maneuverability for the powered two-wheel vehicle 100 that is helpful in urban and other crowded environments. The powered two-wheel vehicle 100 is steered by the rider leaning forwards and backwards to shift their weight to either side of a centerline of the powered two-wheel vehicle 100. As the rider shifts their weight to one side or the other of the centerline, the front wheel 108 is pivoted in the direction that the rider leans to facilitate turning. In this way, the powered two-wheel vehicle 100 can be steered only by the rider shifting their weight. Applicant notes that at lower speeds, when the rider leans to one side the front fork 104 and front wheel 108 turn to facilitate steering of the powered two-wheel vehicle 100. As speed increases, gyroscopic forces of the rotation of front wheel 108 dominate such that the lean of the rider causes the powered two-wheel vehicle 100 to lean to one side so that the point where the ground contacts the front and rear wheels 108, 110 is moved away from the center and towards the side of the front and rear wheels 108, 110. Thus, the rider can "carve" when steering the powered two-wheel skateboard 100 like a snowboard or surfboard.

The front wheel 108 and the rear wheel 110 each include tires 178 that have a rounded profile to facilitate the carving turning behavior. The rounded profile of the tire 178 provides a sufficient contact area with the ground while the wheel 108, 110 leans during a turn so that the tire 178 does not slip laterally. The tires 178 can be formed from any suitable material and can be solid, inflated, or take on any other suitable form. The exemplary powered two-wheel vehicle 100 described herein includes tires 178 that are inflated to act as a suspension absorbs impacts with the ground surface to provide a smoother ride for the rider.

The chassis 102 extending between the rotatable front fork 104 and a fixed rear fork 106 provides support for a first foothold 112 and a second foothold 114 on which the rider can stand. The chassis 102 also provides a rigid connection between the front wheel 108 and the rear wheel 110 and can be formed from a single component or from many components. For example, the chassis 102 shown in FIG. 5 includes a pair of side beams 116 extending between a front bulkhead 118 and a rear bulkhead 120 and a bottom plate 244 that extends between the two side beams 166. The bottom plate 244 can be attached to the side beams 116 and the front and rear bulkheads 118, 120 to enclose the bottom of the chassis 102 and provide additional stiffness to the powered two-wheel vehicle 100. The side beams 116, front and rear bulkheads 118, 120, and bottom plate 244 can be rigidly connected via any suitable means, such as, for example, welding, fasteners, brackets, and the like. The side beams or rails 116 can be formed from tubes, extruded shapes, or sheet metal bent into an appropriate shape, such as a C-shape and can extend beyond the front and rear bulkheads 118, 120 and be integrally formed with other components of the powered two-wheel vehicle 100, such as, for example, the fixed rear fork 106 or a pair of frame tubes 134 that support a head tube 130 of a steering assembly 128.

The chassis 102 includes a compartment 242 for carrying and protecting various components of the powered two-wheel vehicle 100. The compartment 242 can be formed between side beams or rails 116, the bulkheads 118, 120, and the bottom plate 224 and can be covered and enclosed by a deck 122. The compartment 242 can be accessed via removal of the bottom plate 224 and/or the deck 122. In an example of a powered two-wheel vehicle 100, the compartment 242 is a water-tight compartment that includes one or more seals or gaskets to prohibit the ingress of water, dirt, and debris from entering the compartment 242 and potentially damaging any sensitive components stored therein.

In a chassis 102 formed from a single piece of material, the side beams or rails 116, the bulkheads 118, 120, and the bottom plate 244 can be formed as portions of the single piece of material and the deck 122 can be removably attached to the chassis 102. Alternatively, the deck 122 can be integrally formed as part of the chassis 102 and the bottom plate 244 can be removably attached to the chassis 102. Integrally forming the elements of the chassis 102 from a single piece of material can be accomplished by any suitable means, such as, for example, by machining, forging, injection molding, stamping, and the like. In examples of powered two-wheel vehicles 100 with a single-piece chassis 102, the compartment 242 can be formed without seams or joints that could leak.

The bottom plate 244 can also act as a skid plate that facilitates sliding over curbs, rails, or other obstacles in the environment during the operation of the powered two-wheel vehicle 100. The bottom plate 244 can include a wear coating or a replaceable wearable component so that sliding across the bottom plate 244 does not damage the material of the bottom plate 244 and chassis 102. In an example of a powered two-wheel vehicle 100, the bottom plate 244 is made from aluminum includes a removable skid plate (not shown) that is attached to the bottom plate 244 and is made from, for example, ultra-high molecular weight plastic (UHMW) that is more resistant to wear than the aluminum of the bottom plate 244. A removable skid plate allows the skid plate to be easily replaced when it is too worn and can no longer protect the bottom plate 244.

The first foothold 112 and second foothold 114 provide locations for the rider to place each of their feet and can have a high friction surface for providing additional friction between the first and second footholds 112, 114 and the feet of the rider. The first foothold 112 and the second foothold 114 can take on a wide variety of forms, such as, for example, foot bindings like those typically seen on snowboards, clips for receiving specially configured boots or shoes, or a single deck, such as the deck 122. The deck 122 is attached to the chassis 102, has a length of 26 inches to 38 inches, and is covered with a high friction material, such as grip tape. In an example of a powered two-wheel vehicle 100, the deck 122 is attached to both of the side beams 116 and the bottom plate 244 is attached to both of the side beams 116 and the bulkheads 118, 120 so that the components of the chassis 102 form a torsion box arrangement that provides a stable and stiff platform for the powered two-wheel vehicle 100 that resists twisting that could be detrimental to the ride quality and precision control offered by the powered two-wheel vehicle 100.

The deck 122 can include widened portions 124 that provide additional support for the feet of the rider and can act as handles when the rider is in a crouching position. While the deck 122 is shown as a single, continuous piece of material, the deck 122 can include various openings or be formed from multiple pieces spaced apart around an opening to accommodate other components of the powered two-wheel vehicle 100, such as, for example, a motor, a power source (e.g., a battery), a handle, or the like. The deck 122 can optionally include a seal (not shown) that prohibits ingress of water or other contaminants into the interior spaces of the powered two-wheel vehicle 100 that can include electronic components. A guard 126 extends from the rear bulkhead 120 at a rear end of the deck 122 to prohibit contact between the rider's foot and the rear wheel 110.

The height of the deck 122 below the height of the centers of the wheels 108, 110—i.e., the wheel radius—can be 0.125 inches to 5 inches. The top of the deck 122 can also be even with the center of the wheels 108, 110, that is, the height of the deck 122 above the ground can be equal to the radius of the front and rear wheels 108, 110. As the deck 122 is lowered relative to the centerline of the wheels 108, 110 the stability of the rider on the powered two-wheel vehicle 100 is increased as the weight of the rider is applied to a surface below a pivot point of the powered two-wheel vehicle 100 which provides inherent stability against leaning as the center of mass of the rider is moved closer to the rotational axis of the wheels 108, 110. However, reducing a ground clearance measured between the bottom of the powered two-wheel vehicle 100 and the ground can limit the size of bumps or rough terrain the powered two-wheel vehicle 100 can traverse without getting stuck or damaged. Thus, a balance must be struck between the height of the deck 122 and the ground clearance below the chassis 102.

The rotatable front fork 104 is attached to the chassis 102 via a steering assembly 128 that includes the head tube 130 fixedly attached to the chassis 102. The steering post or tube 132 extends from the rotatable front fork 104 and into the head tube 130 to facilitate rotation of the rotatable front fork 104 relative to the chassis 102. As is described in greater detail below, the steering assembly 128 provides passive stability to the powered two-wheel vehicle 100 while traveling across all kinds of terrain. The head tube 130 is supported above and ahead of the front wheel 108 by two arched frame tubes 134 extending from the front bulkhead 118 of the chassis 102. The frame tubes 134 have an arched shape to provide clearance for the front wheel 108 to rotate from side-to-side as the powered two-wheel vehicle 100 is turned by the rider. An optional mud guard (not shown) can be attached to the frame tubes 134 at the front of the powered two-wheel vehicle 100 and the guard 126 or rear fork 106 at the rear of the powered two-wheel vehicle 100. In another configuration, an optional training post (not shown) can extend vertically from the front bulkhead 118 between the frame tubes 134 to a handle (not shown) that the rider can grip for added stability and steering control when learning to ride the powered two-wheel vehicle 100. The handle of the training post can have an adjustable height to accommodate riders of different heights.

A motor 136 provides motive power to one or both of the front wheel 108 and the rear wheel 110. The motor 136 of the powered two-wheel vehicle 100 is an electric hub motor that is mounted inside the rear wheel 110 and is attached to the rear fork 106. Alternatively, the motor 136 can be mounted to the chassis 102 and be connected to one or both of the wheels 108, 110 via a transmission. The motor 136 can be an electric motor, as described herein, or can be an internal combustion engine running on fuel supplied from a fuel tank, or any other suitable means of supplying motive power to the wheels 108, 110. Control of the motor 136 can be accomplished by applying and releasing tension on a throttle cable for an internal combustion engine or can involve adjustments to the current and voltage provided to the motor 136 for an electrical motor. When the powered two-wheel vehicle 100 is unpowered, the rear wheel 110 is allowed to rotate freely so that the powered two-wheel vehicle 100 can be rolled along the ground without resistance. To transport the powered two-wheel vehicle 100, the user can grip one of the frame tubes 134 to lift the front wheel 108 off of the ground so that the powered two-wheel vehicle 100 rolls on the rear wheel 110 and the user only has to lift half of the weight of the entire vehicle.

For the powered two-wheel vehicle 100 described herein, electrical power is provided to the motor 136 from a battery 138. The battery 138 can be contained within the compartment 242 that is enclosed by the bottom plate 244, the side beams 116, and the bulkheads 118, 120 of the chassis 102, and the deck 122. The compartment 242 can be formed when the deck 122 or the bottom plate 244 are attached to the chassis 102. In some embodiments, the bottom plate 244 and/or the deck 122 are removable to provide access to the compartment 242. To prohibit water and other foreign matter from entering the compartment 242 and damaging components arranged therein, the compartment 242 can be a water-tight compartment 242 that includes one or more seals or gaskets. The battery 138 can be any suitable battery that provides sufficient power to the motor 136—e.g., a continuous wattage ranging from 400 watts to 3000 watts—and can have a working voltage ranging from 24 volts to 90 volts. The battery 138 is rechargeable via a charging port 140 provided in one of the side beams 116 of the chassis 102.

A control system 142 of the powered two-wheel vehicle 100 receives data from a wide variety of input signals 206 and generates output signals 208 based on those inputs and based on the programming of the control system 142. The control system 142 includes one or more processors and memory for storing data and programming instructions. The control system 142 can be arranged in the compartment 142 along with the battery 138. The data stored in the control system 142 can include data related to the current state of the powered two-wheel vehicle 100, historical performance data, computer-executable instructions for controlling the powered two-wheel vehicle 100, and the like. The instructions may be, for instance, instructions for implementing functionality described as being carried out by one or more components discussed herein or instructions for implementing one or more of the methods described herein. The operation of the control system 142 to receive a wide variety of input signals and to generate a wide variety of output signals is described in greater detail and with respect to FIG. 21, below.

One example of an input received by the control system 142 is a user input signal 144 from a user input device 146. The control system 142 processes the user input signal 144 and can then output a motor control signal to the motor 136 to cause the powered two-wheel vehicle 100 to, for example, accelerate or decelerate. The user input signal 144 can be transmitted to the control system 142 of the powered two-wheel vehicle 100 wirelessly, as is shown in FIG. 1, or via a cable or wire connecting the user input device 146 to the control system 142. The user input device 146 can optionally be secured to the training post described above. The user input device 146 can include a wide variety of control elements such as, for example, buttons, knobs, wheels, triggers, sliders, or the like. The user input device 146 can also include feedback elements, such as, for example, a display 202 (FIG. 11), a speaker, a vibration motor, and the like for providing visual, audible, and tactile feedback to the rider based on, for example, user input and the conditions of the powered two-wheel vehicle 100.

Figure 11:
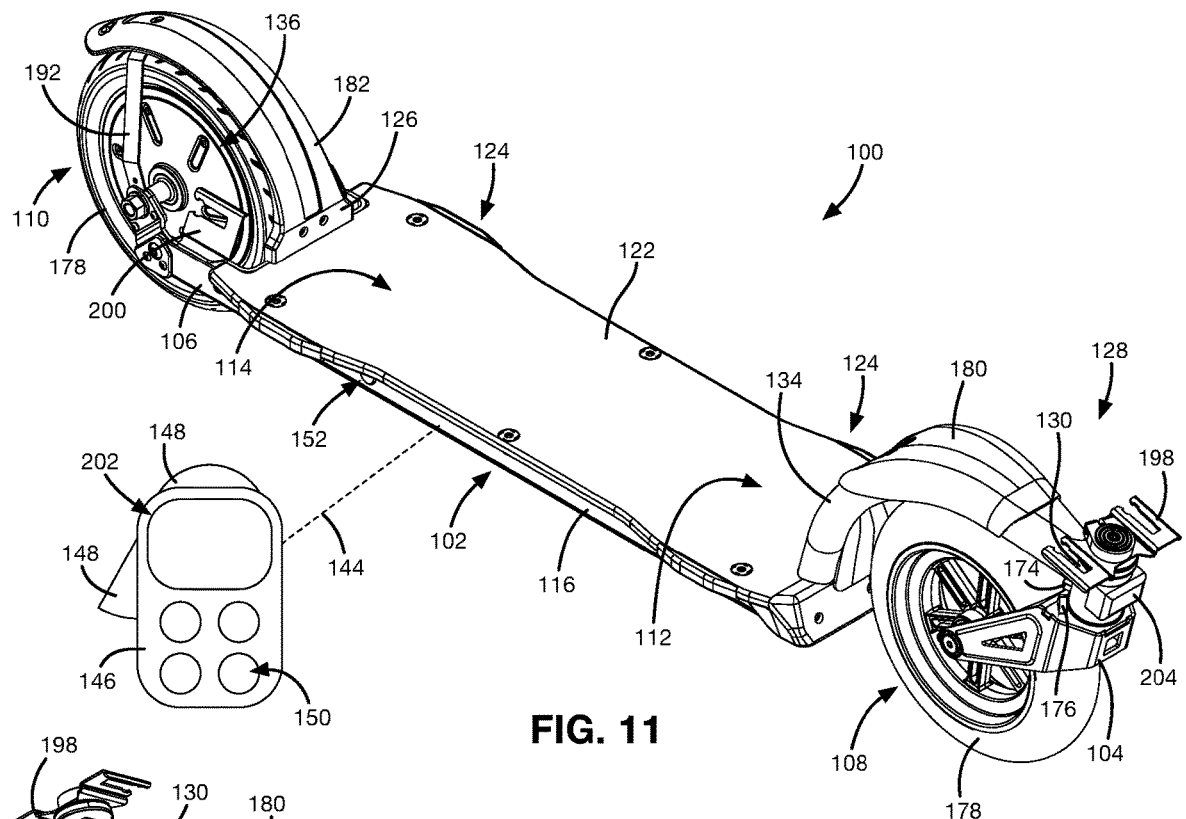
FIG. 11 shows a top perspective view of a powered two-wheel vehicle.

The user input device 146 shown in FIGS. 1 and 11 includes a control wheel 148 that the rider can rotate in a first direction to accelerate to increase speed and a second direction to decelerate or brake. Braking can be accomplished via a mechanical brake or via regenerative braking that recharges the battery 138 from the motor 136 being rotated by the rear wheel 110. One or more buttons 150 can also be included on the user input device 146 that allow the rider to change an operating mode of the powered two-wheel vehicle 100 (e.g., for different terrain or power setting-limiting the maximum current supplied to the motor) or to switch the orientation or handedness of the user input device 146 depending on whether the rider wants to use their left hand or right hand to control the powered two-wheel vehicle 100 via the user input device 146. The user input device 146 can also include sensors such as, for example, an accelerometer, gyroscope, or the like that measures the acceleration or tilt angle of the rider to provide additional input to the control system 142. A power button 152 can be provided on the powered two-wheel vehicle 100 to allow the rider to turn the powered two-wheel vehicle 100 on and off. Alternatively, the user input device 146 can be used to activate the powered two-wheel vehicle 100.

Referring now to FIGS. 7-10, the steering assembly 128 is shown in greater detail. As was noted above, the steering assembly 128 includes the head tube 130 that is supported by two frame tubes 134 that extend from the front bulkhead 118 of the chassis 102. A bushing or bearing 154 is arranged at a bottom end of the head tube 130 for receiving the steering tube 132 extending from the front fork 104. The weight of the powered two-wheel vehicle 100 and rider is transferred to the front wheel 108 via the steering assembly 128 and bushing or bearing 154 that is made from a lubricious material or includes ball bearings to reduce friction between the steering tube 132 and the head tube 130. The steering tube 132 extends through a rotational damper 156 arranged in the head tube 130 and is secured within the head tube 130 by a clamp 158 and a cap 160 that are secured to an upper end of the steering tube 132. The cap 160 can be attached to a nut (not shown) inside of the steering tube 132.

The head tube 130 is arranged having an axis 162 that is arranged at a rake angle 164 relative to a vertical line 166 perpendicular to the side beams or rails 116 of the chassis 102. The axis 162 points downward and rearward from the top of the head tube 130 such that the rake angle 164 is considered a negative rake angle. The magnitude of the rake angle 164 of the head tube 130 can be in a range of 0 degrees to 25 degrees, or from 5 degrees to 20 degrees, or from 10 degrees to 15 degrees. The magnitude of the rake angle 164 of the illustrated head tube 130 is 15 degrees.

The negative rake angle 164 of the head tube 130 and the offset of the front fork 104 causes the front wheel 108 to contact a ground plane 168 behind the axis 162 of the head tube 130 so that the front wheel 108 is said to be trailing the head tube 130. A trailing distance 170 is defined between the point where the front wheel 108 contacts the ground plane 168 and the point where the axis 162 intersects the ground plane 168. The trailing distance 170 of the powered two-wheel vehicle 100 is in a range of 2 inches to 7 inches. Increasing the trailing distance 170—e.g., by lengthening the front fork 104—reduces the effect known as "caster flutter" that can occur as the front wheel 108 is driven across the ground. The front fork 104 can be lengthened by increasing the distance between the steering tube 132 and the axle of the front wheel 108, for example, by extending the length of the arms of the front fork 104. The trailing distance 170 can also be impacted by the magnitude of the rake angle and the diameter of the wheel.

Figure 9:
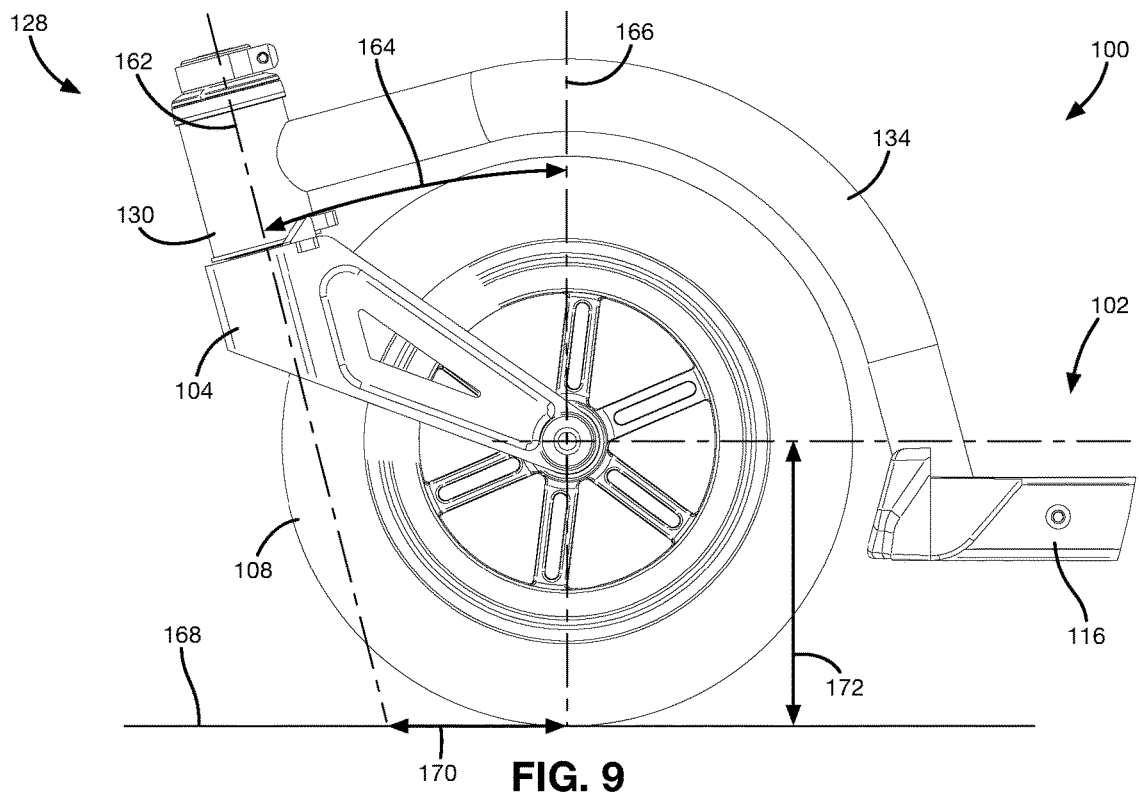
FIG. 9 shows an enlarged side view of the front wheel of the powered two-wheel vehicle of FIG. 1 with the front wheel in a straight condition.
Figure 10:
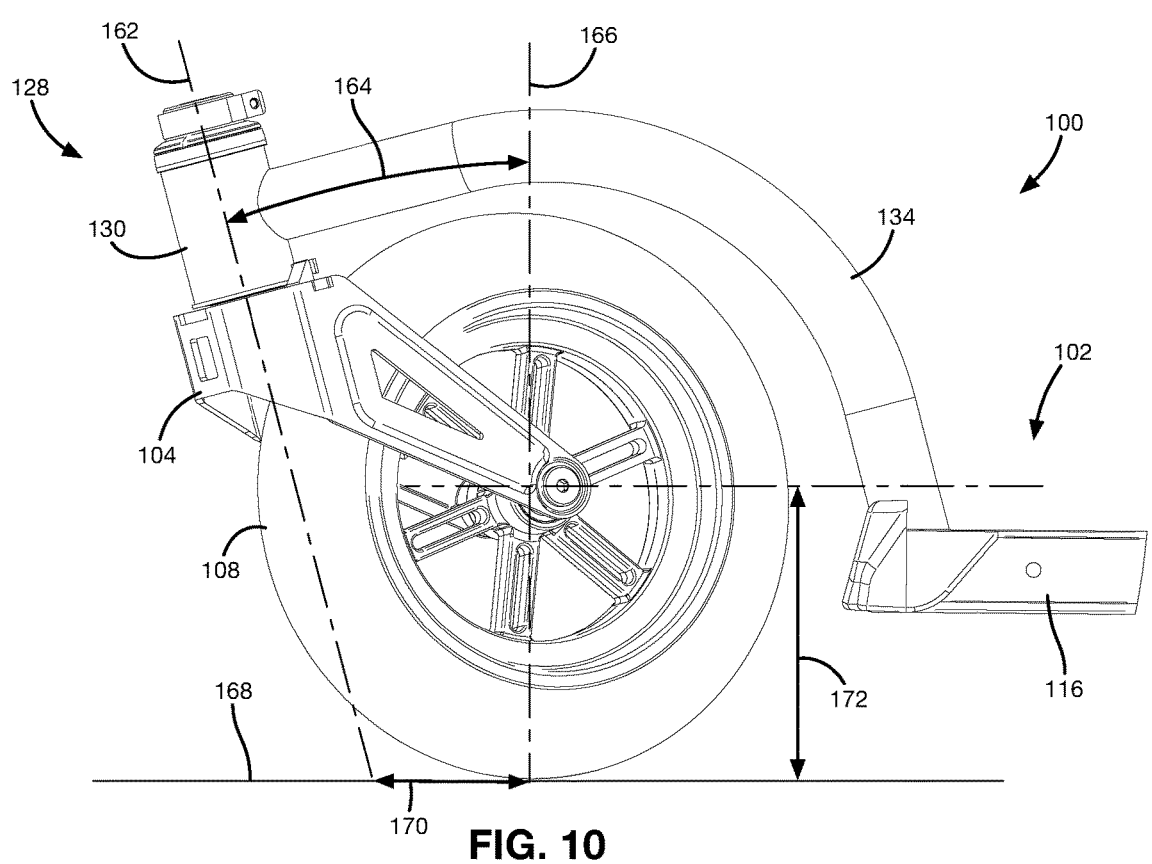
FIG. 10 shows an enlarged side view of the front wheel of the powered two-wheel vehicle of FIG. 1 with the front wheel in a turned condition.

Referring now to FIGS. 9 and 10, the front wheel 108 is shown in a straight condition (FIG. 9) and a turned condition (FIG. 10). An axle height 172 of the front wheel 108 is measured between the ground plane 168 and the axis of rotation of the front wheel 108. Because the head tube 130 of the steering assembly 128 has a negative rake angle 164, rotation of the front fork 104 and front wheel 108 causes the axle height 172 of the front wheel 108 to increase as can be seen in FIG. 10. The weight of the rider and the powered two-wheel vehicle 100 oppose the increase in axle height 172 and work together to encourage the front fork 104 and front wheel 108 to return to a straight condition where the axle height 172 is lowest. When the front wheel 108 becomes unloaded after impact with a bump or rough terrain and happens to turn to one side or the other, further contact with the ground encourages the front wheel 108 to straighten out. In this way, the negative rake angle 164 of the head tube 130 contributes to a more stable ride of the powered two-wheel vehicle 100.

At higher speeds, such an encounter with a bump or crack in the terrain and rocks or other foreign objects can induce caster flutter in the steering assembly 128, even though the steering assembly 128 is generally resistant to a caster flutter condition. The inclusion of the rotational damper 156 in the steering assembly enhances the stability already provided by the geometry of the steering assembly 128 by, for example, prohibiting caster flutter at high speeds. The rotational damper 156 connected between the head tube 130 and the steering tube 132 provides a dampening effect—i.e., resistance to movement—on the rotation of the steering tube 132. A wide variety of mechanisms can be used to resist rotational movement of the steering tube 132 relative to the head tube 130, some of which are described in greater detail below. In some powered two-wheel vehicles, the dampening effect increases in proportion to the angular velocity of the steering tube 132; put another way, the rotational damper 156 can resist rotation the faster the steering tube 132 rotates. Consequently, when the rider leans in a direction to turn the powered two-wheel vehicle 100, the front wheel 108 is prohibited from jerking too quickly in either direction. Similarly, when the rider hits a bump or rough terrain that causes the front wheel 108 to become unloaded and even lift off of the ground, the front wheel 108 is prohibited from turning too quickly such that re-engagement of the front wheel 108 with the ground causes a sudden turn. Thus, inadvertent, or unintended turning and caster flutter at high speeds are prohibited and the stability of the powered two-wheel vehicle 100 is maintained.

As is noted above, the rotational damper 156 can take on a wide variety of forms, such as, for example, a spring damper, a linear-piston damper, a polymer-based friction damper, a rotational disc damper, a friction damper, a viscoelastic damper, a hydraulic damper, and the like. In some powered two-wheel vehicles, the dampening effect is provided by increasing friction between the steering tube 132 and the head tube 130 using a bushing, an O-ring, or other annular component that is held in place and optionally compressed by a nut. As noted above, these mechanisms resist the rotation of the steering tube 132 relative to the head tube 130 and other components of the steering assembly 128. The resistance force applied by the rotational damper 156 can be uniform or can change in proportion to the rotation of the steering tube 132. Some rotational dampers apply a resistance force that increases in proportion to the magnitude of the rotation, that is, how far the steering tube 132 has turned from the neutral or straight position. Some rotational dampers apply a resistance force that increases in proportion to the angular velocity of the rotation, that is, how quickly the steering tube 132 is turning. Some rotational dampers apply a resistance force that increases with both magnitude and angular velocity of rotation of the steering tube 132. Still other rotational dampers apply a resistance force that is designed to increase and/or decrease according to the magnitude and/or angular velocity of rotation of the steering tube 132 according.

The maximum amount that the front wheel 108 can turn is limited by a center stop 174 extending in a rearward direction from the head tube 130 and two side stops 176 that extend upward from the front fork 104. As the front fork 104 and front wheel 108 rotate, the side stops 176 engage the center stop 174 to prohibit rotation of the front fork 104 beyond a predetermined rotation angle measured from a centerline of the powered two-wheel vehicle 100 to the side stop 176, such as, for example, from 15 degrees to 40 degrees, from 20 degrees to 35 degrees, or from 25 degrees to 30 degrees.

The powered two-wheel vehicle 100 described herein can also be provided as a rolling chassis, i.e., including all of the components of the powered two-wheel vehicle 100 except for the battery 138 and the control system 142 that are provided by the purchaser of the rolling chassis. A purchaser of the rolling chassis version of the vehicle 100 can supply their own battery and control system to facilitate the operation of the powered two-wheel vehicle 100. In this way, the purchaser can take advantage of all of the benefits of the steering assembly 128 and the motor 136 that provide a stable ride while adding their own electronic systems that they can experiment with.

Figure 12:
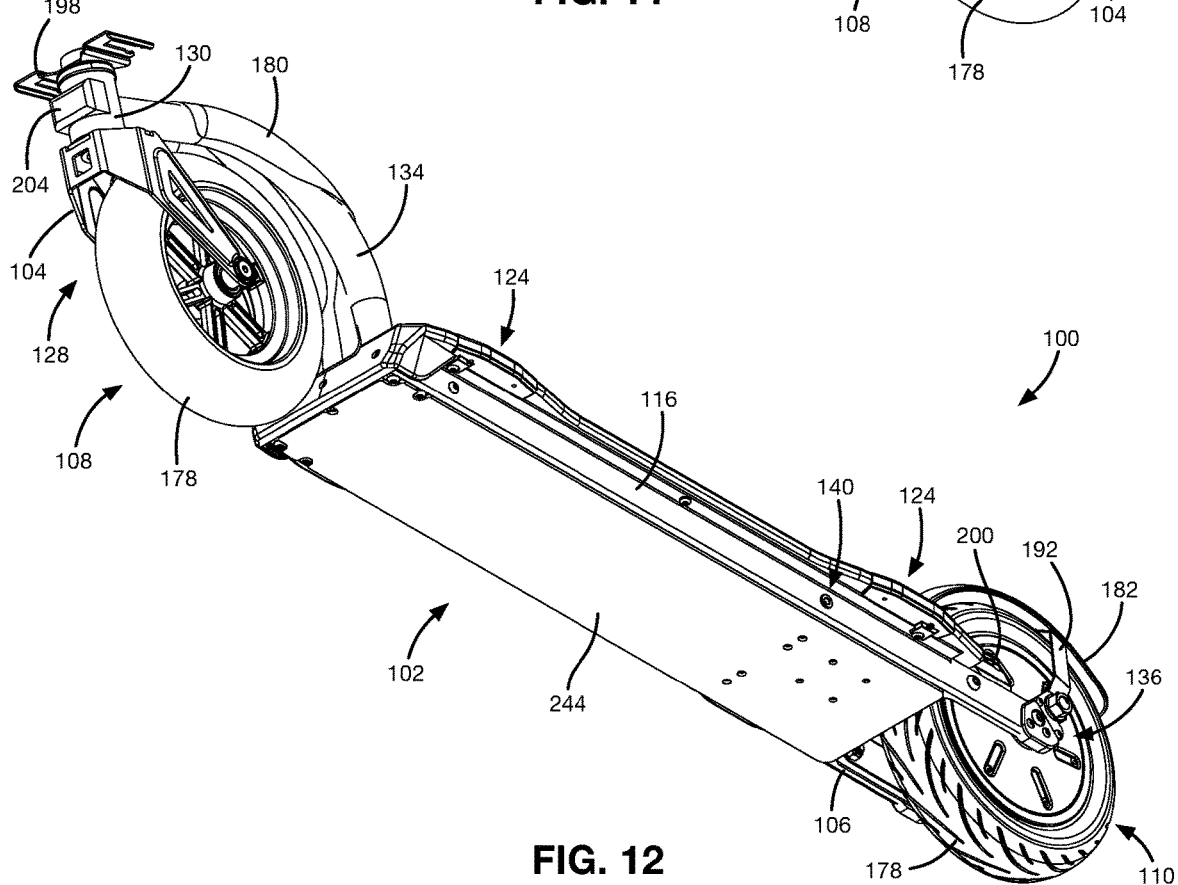
FIG. 12 shows a bottom perspective thereof.
Figure 13:
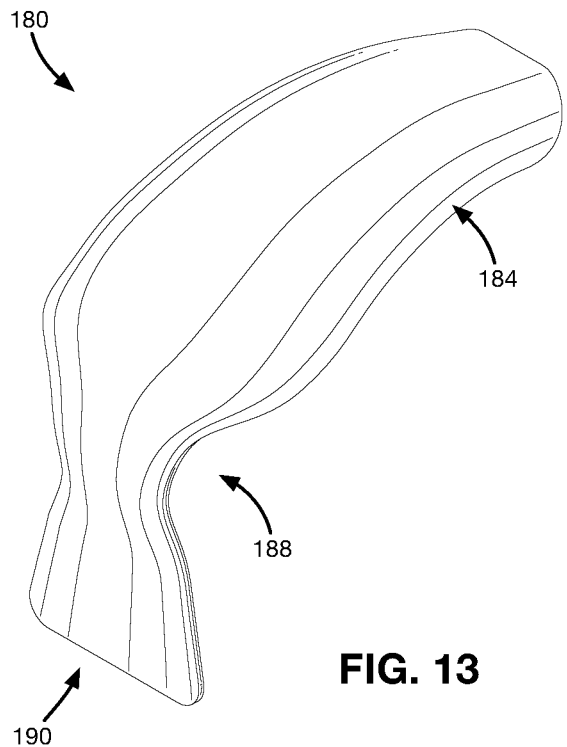
FIG. 13 shows a top perspective view of a front fender of the powered two-wheel vehicle.
Figure 14:
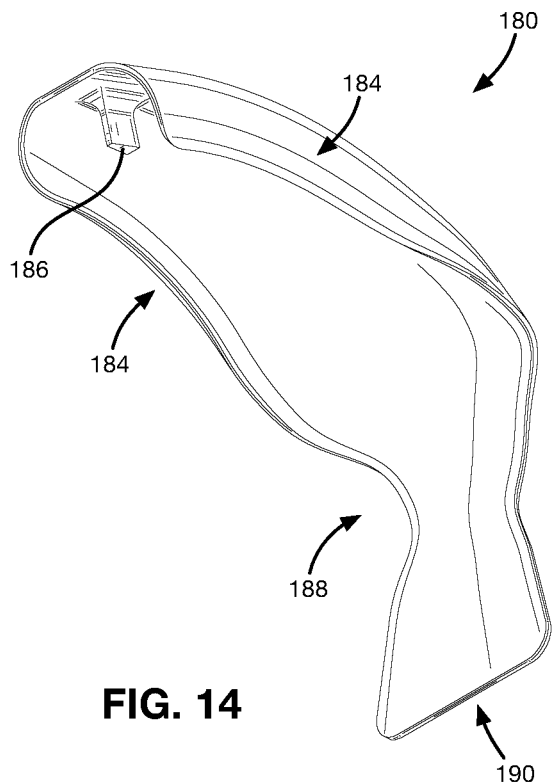
FIG. 14 shows a bottom perspective view thereof.
Figure 15:
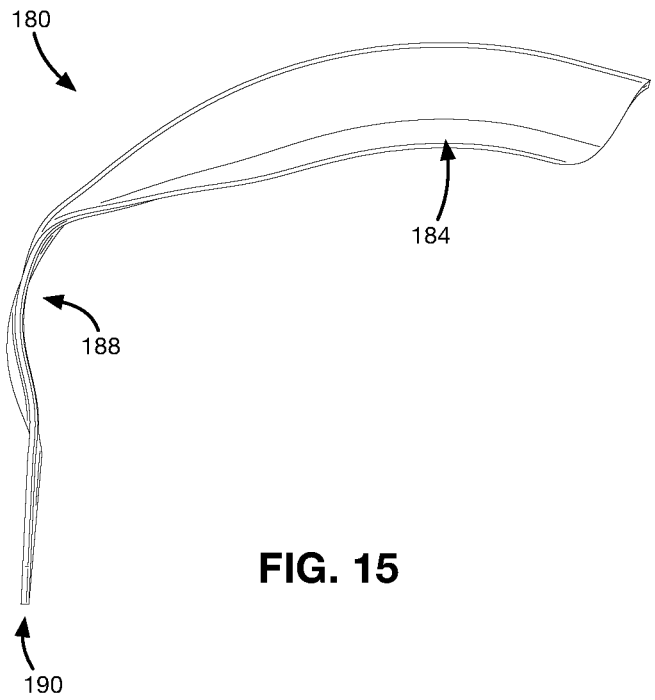
FIG. 15 shows a side view thereof.
Figure 16:
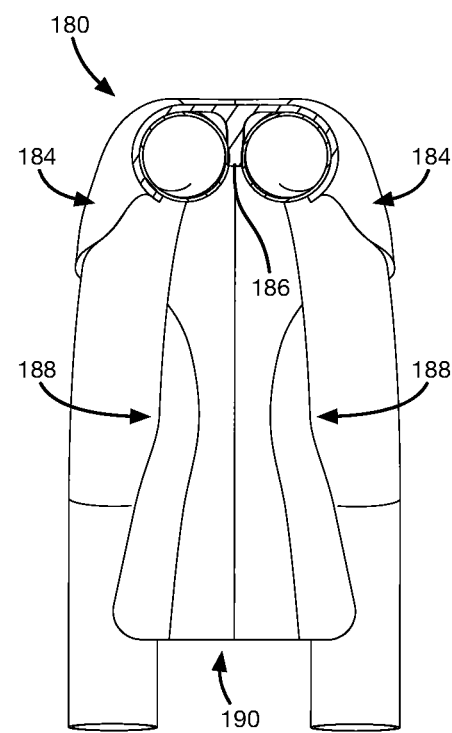
FIG. 16 shows a cross-sectional view of the front fender assembled to frame tubes of the powered two-wheel vehicle.

Referring now to FIGS. 11 and 12, the exemplary powered two-wheel vehicle 100 is shown again with optional features such as, for example, a front fender 180, a rear fender 182, a front light bracket 198, and a rear light bracket 200. In some embodiments, the front fender 180 can be attached to and removed from the frame tubes 134 without the use of tools. Referring now to FIGS. 13-20, the front fender 180 and a method of assembling the front fender 180 to the powered two-wheel vehicle 100 without tools are shown. Attaching the front fender 180 to the frame tubes 134 obstructs the path of water and other road debris that might otherwise splash up between the frame tubes 134 and onto the rider.

The front fender 180 has a curved shape that conforms to the shape of and attaches to the frame tubes 134. The front fender 180 includes flexible side walls 184 that partially wrap around the frame tubes 134. A protrusion 186 extending downward between the flexible side walls 184 facilitates the alignment of the front fender 180 between the frame tubes 134. The front fender 180 is shaped to pass between the frame tubes 134 and engage the front bulkhead 118. The front fender 180 narrows to form side recesses or cut-outs 188 that accommodate the frame tubes 134 as the front fender 180 passes between the frame tubes 134 and widens at a bottom end 190. The front fender 180 can be shaped so that when the front fender 180 is attached to the frame tubes 134 the bottom end 190 is biased against the front bulkhead 118. The biasing of the bottom end 190 toward the front bulkhead 118 can be achieved by forming the front fender 180 into a curved shape that has a larger radius than the curve of the frame tubes 134 so that the front fender 180 is partially bent during installation.

The rear fender 182 is secured to the guard 126 and is supported above the rear wheel 110 by a rear fender support 192 that attaches to the rear fork 106. Thus, the front fender 180 and the rear fender 182 can be easily removed from and attached to a powered two-wheel vehicle 100 so that fenders 180, 182 having a different appearance can be attached to the powered two-wheel vehicle 100 based on the preference of the rider. For example, the fenders 180, 182 can be formed in a wide variety of shapes, in a wide variety of colors, and can be covered in various images and graphics.

Figure 17:
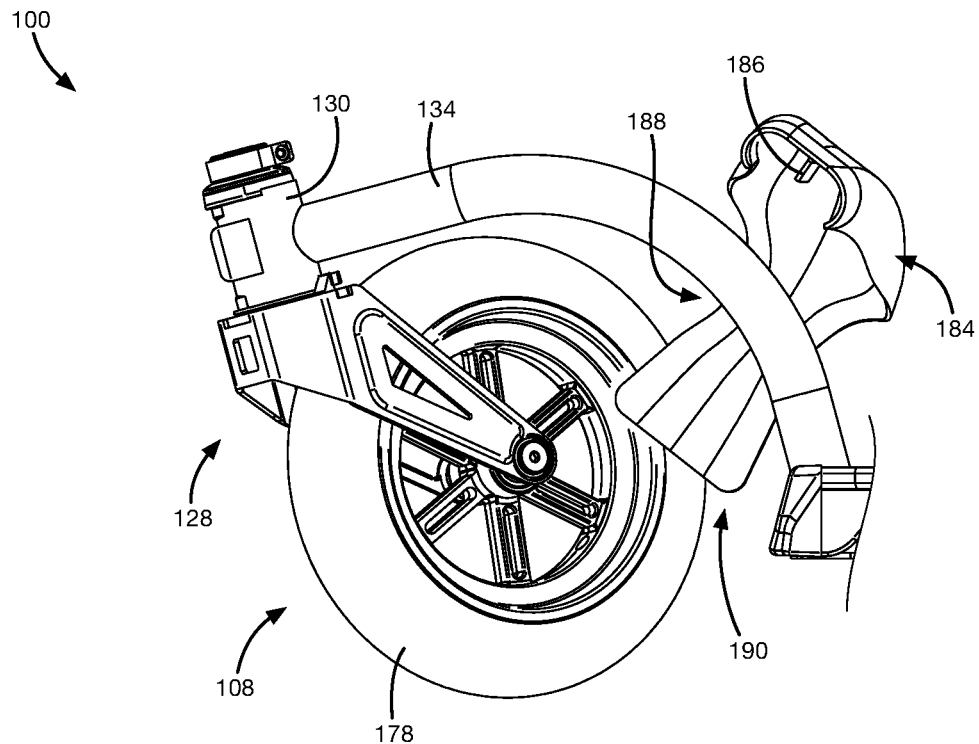
FIG. 17 shows a side view of the front fender inserted between the frame tubes.
Figure 18:
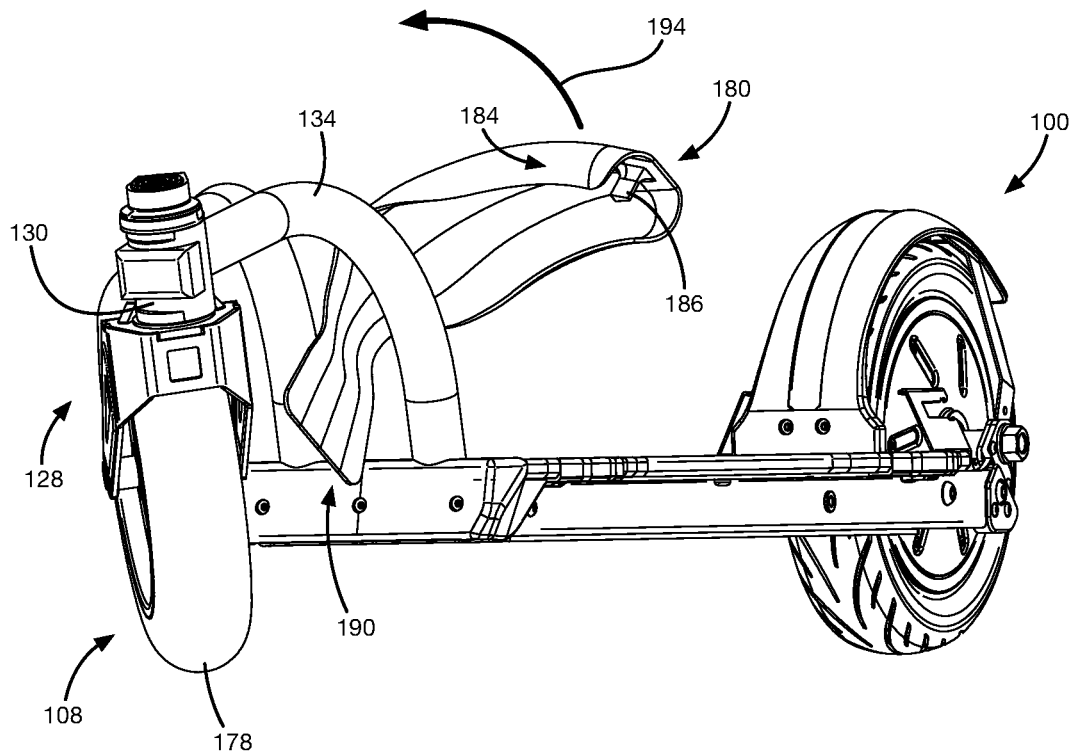
FIG. 18 shows a left front perspective view thereof.
Figure 19:
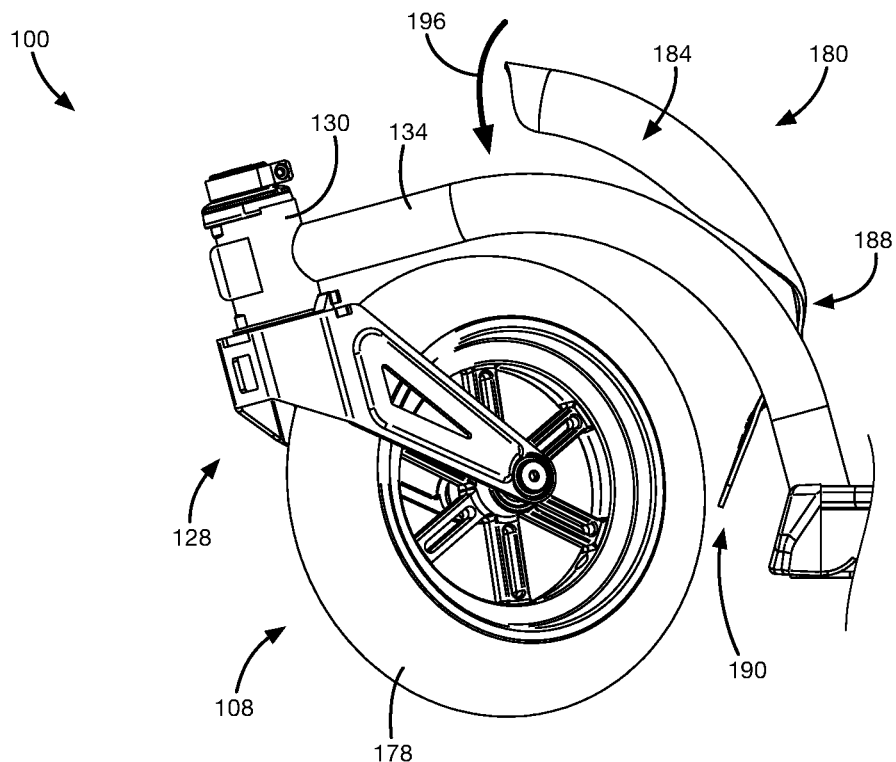
FIG. 19 shows a side view of the front fender being attached to the frame tubes.
Figure 20:
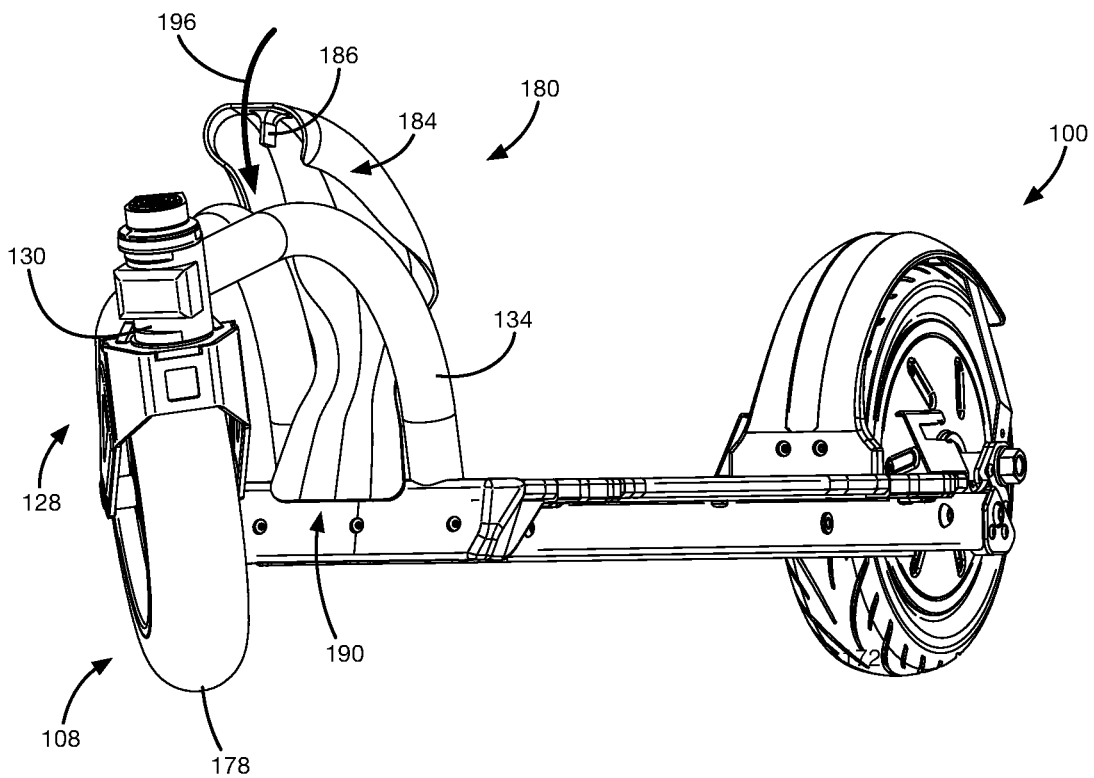
FIG. 20 shows a left front perspective view thereof.

The front fender 180 is shown being attached to the frame tubes 134 in FIGS. 17-20. As can be seen in FIGS. 17-18, the front fender 180 is rotated sideways so that the bottom end 190 can fit between the frame tubes 134 even though the bottom end 190 can be wider than the gap between the frame tubes 134. The front fender 180 is inserted between the frame tubes 134 until the side cut-outs 188 are approximately aligned with the frame tubes 134 and is then rotated in the direction shown by the arrow 194. The front fender 180 is then rotated until the protrusion 186 is aligned between the frame tubes 134 and the flexible side walls 184 are aligned with the sides of the frame tubes 134. The front fender 180 is then moved downward toward the frame tubes 134 as indicated by the arrow 196 in FIGS. 19-20. Pressing the front fender 180 downward with the protrusion 186 between the frame tubes 134 causes the flexible side walls 184 to spread apart and then snap back toward each other once the front fender 180 is fully attached to the frame tubes 134.

Referring again to FIGS. 11-12, the powered two-wheel vehicle 100 can optionally include a front light bracket 198 and/or a rear light bracket 200. Lights (not shown) can be attached to the front and rear light brackets 198, 200 to provide illumination of the path ahead of the powered two-wheel vehicle 100 and/or awareness of the presence of the powered two-wheel vehicle 100 to others who are following behind the rider on the powered two-wheel vehicle 100. The lights can be batter powered or can be powered from the battery 138 of the powered two-wheel vehicle 100 via electrical wires extending from the front or rear lights to the battery 138 or to receptacles that are electrically connected to the battery 138.

The powered two-wheel vehicle 100 of FIGS. 11-12 and 17-20 also includes an electro-mechanical rotational damper 204 that can be provided in place of or in addition to the rotational damper 156 described above. The electro-mechanical rotational damper 204 provides a variable damping force based on a damping force signal sent from the control system 142. The variable damping force applied to the steering tube 132 by the electro-mechanical damper 204 can permit the steering tube 132 to rotate freely and can provide sufficient damping force to prohibit rotation of the steering tube 132. The damping force exerted by the electro-mechanical damper 204 can be generated by an electric motor, an electric actuator, electromagnets, or the like and can incorporate features of the rotational dampers described above.

The damping force applied by the electro-mechanical rotational damper 204 on the steering tube 132 can vary based on the rotational position and/or the angular velocity of the steering tube 132 relative to the head tube 130. The amount of damping force exerted by the electro-mechanical rotational damper 204 can also vary based on the speed of the powered two-wheel vehicle 100 over the ground. That is, the control system 142 can send a different damping force signal to the electro-mechanical damper 204 depending on the current state of the powered two-wheel vehicle 100 and performance parameters established at the factory or by the rider. In some embodiments, the electro-mechanical damper 204 can apply sufficient force to prohibit rotation of the steering tube 132 so that the rotational position of the front wheel 108 is locked until the control system reduces the damping force so that the front wheel 108 is free to turn.

Figure 21:
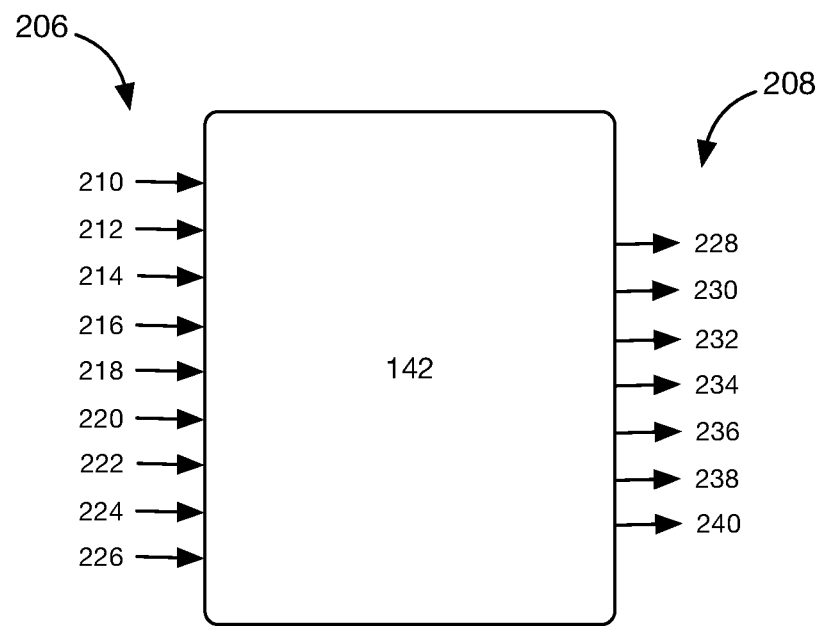
FIG. 21 shows a block diagram of a control system for an exemplary powered two-wheel vehicle.

Referring now to FIG. 21, a block diagram of the control system 142 is shown to illustrate inputs 206 that can be received by and outputs 208 that can be generated by the control system 142. The values of the inputs 206 and the outputs 208 can be recorded and stored in a memory unit of the control system 142 or another storage unit for later retrieval and analysis locally or for transmission wirelessly to a server for aggregation and analysis of the data transmitted from a plurality of powered two-wheel vehicles 100. For example, the owner of the powered two-wheel vehicle 100 may want to download the data during a recent ride for analysis or comparison with other riders. As another example, the owner of a fleet of powered two-wheel vehicles 100 may want to received data transmitted from each vehicle in the fleet to keep track of the vehicle performance and location.

The inputs or input signals 206 that can be received by the control system 142 include user input 210 from the user input device 146, location data 212, altitude data 214, vehicle performance data 216, battery data 218, motor data 220, steering data 222, vehicle status data 224, sensor data 226, and the like. The user input data 210 can include the selected performance mode, an instruction to accelerate or decelerate, an instruction to increase or decrease steering damping, an instruction to activate or deactivate lights or a horn attached to the powered two-wheel vehicle 100, an instruction to power the vehicle on or off, or the like. The location data 212 can be provided by a GPS or other geo-location device and can include the geographic location, altitude, velocity, and other GPS-related data related to the powered two-wheel vehicle 100. Altitude data 214 can be provided alongside the location data 212 from a GPS device or can be provided from an altimeter. The vehicle performance data 216 can be provided by an accelerometer, a gyroscope, or the like and can include the current speed, acceleration or deceleration, and orientation or tilt of the powered two-wheel vehicle 100. The battery data 218 can include the current, voltage, temperature, and capacity of the battery 138. The motor data 220 can include the input current, input voltage, temperature, output torque, and output RPM. The steering data 222 can include the angle and/or the angular velocity of the front wheel 108 relative to the powered two-wheeled vehicle 100. The vehicle status data 224 can include whether the vehicle is powered on, whether optional lights are activated, whether a user input device is connected to the vehicle, and the like. The sensor data 226 can include data from a wide variety of sensors for monitoring properties of the powered two-wheel vehicle 100 and the surrounding environment, such as, for example, cameras for gathering visual data, microphones for gathering audio data, and moisture sensors for detecting water inside the powered two-wheel vehicle 100.

The outputs or output signals 208 that can be generated by the control system 142 include signals for motor control 228, braking control 230, damper control 232, light control 234, speaker control 236, user feedback 238, data recording 240, and the like. Motor control signals 228 can include an instruction to accelerate, to decelerate, and to limit the power output—for example, to limit the maximum speed or acceleration. A braking control signal 230 can instruct mechanical or electro-mechanical breaks to actuate or can be similar to a deceleration signal with an increased rate of deceleration depending on the magnitude of the braking signal. Steering damper control signals 232 can include an instruction to increase or decrease the damping force applied to the steering tube 132 and to apply maximum damping force to lock the steering tube 132 in place. Light control signals 234 can instruct various lights of the powered two-wheel vehicle 100 to activate or deactivate, change intensity, and change color. Speaker control signals 236 can include an instruction to operate a horn and play sounds out of speakers. User feedback signals 238 provide audiovisual and tactile feedback to the rider via displays, speakers, vibration motors, and the like on the powered two-wheel vehicle 100 and similar feedback on the user input device 146 and/or a user's phone, tablet, computer, or the like. User feedback signals can include speed, the selected operating mode, battery level, distance traveled, amount of progress along a route, estimated remaining range, alerts or warnings, and the like. Data recording signals 240 transmit data related to the inputs 206, outputs 208, and a wide variety of values computed or derived from the inputs 206 and outputs 208 to a data storage device that can be part of the control system 142 or can be a separate memory storage device for recording the data transmitted from the control system.

The output signals 208 of the control system 142 can be monitored and fed back into the control system 142 where the input signals 206 and the output signals 208 can be evaluated to facilitate feedback control and machine learning to improve the performance and usability of the powered two-wheel vehicle 100. For example, the control system 142 can monitor the input signals 206 to determine how well the rider is able to balance and control the powered two-wheel vehicle 100 at various speeds and under different conditions to evaluate whether the selected operating mode is appropriate for the rider's ability and suggest a different operating mode if warranted by the outcome of the evaluation. The input signals 206 and output signals 208 can also be monitored and evaluated to determine the efficiency of the motor 136 over time to better predict the estimated range of the powered two-wheel vehicle 100 and when maintenance or repairs may be necessary. As another example, the inputs 206 from, for example, an accelerometer, a gyroscope, a microphone, and the like can in combination indicate that the rider has been in a crash. Crash data can be taken into consideration when recommending a change in operating mode, can be recorded for a vehicle used as part of a fleet of vehicles, and can be reported to a central server.

The control system 142 can also store custom performance profiles that alter the performance of the powered two-wheel vehicle 100 during use. For example, a custom acceleration profile or curve can be used by the control system 142 to determine how quickly to accelerate based on the current speed and the operating mode selected by the user. As another example, a custom damping profile can be used by the control system to determine how much damping force to apply to the steering tube 132 via the electro-mechanical damper 204 based on the operating mode selected by the user, the current speed of the vehicle, and the steering data—e.g., the steering angle and angular velocity of the front wheel. The custom profiles can be accessed and edited by the user via a computer, a smart phone, a tablet, or the like using an application or a web interface connected to the powered two-wheel vehicle 100. The user input device 146 that includes a display 202, such as the user input device 146 shown in FIG. 11, can also be used to edit the custom profiles without the use of an additional device. Thus, a user can tweak the performance characteristics of the powered two-wheel vehicle 100 to suit their needs.

The control system 142 can prohibit operation of the powered two-wheel vehicle 100 absent an authentication device such as a key, a passcode, or a biometric authenticator (e.g., a fingerprint reader). The control system 142 can also store various settings and associate those stored settings with a particular user, such as, for example, custom performance profiles and/or a selected operating mode. Thus, one powered two-wheel vehicle 100 can be shared between multiple users, each with their own personalized settings. Recorded data—e.g., ride history, geo tracking, crash history, etc.—can also be associated with the user who had unlocked the powered two-wheel vehicle 100. When operating a fleet of vehicles, an owner or master account may be able to access all of the data of all users of all of the vehicles to facilitate monitoring of usage patterns by certain users. Associating ride data with a particular user can be used by the control system 142 or by a central server to generate—using standard programming techniques or via machine learning or artificial intelligence—a profile for the user to better tailor the performance of the powered two-wheel vehicle 100 to whichever rider is currently riding the vehicle 100.

Referring again to FIGS. 1 and 11, the user input device 146 is shown in various forms, including with an optional display 202 in FIG. 11. The display 202 can be used to present outputs 208 from the control system 142 to the user and can also be used to present a user interface to the user so that the user can interact with data stored in the control system 142 or for adjusting parameters of the powered two-wheel vehicle 100. The user input device 146 is illustrated in an abstract manner and can take on a wide variety of shapes and form factors, for example, to facilitate being easily held by the user. In some embodiments, the user input device 146 and the powered two-wheel vehicle 100 can also interface wirelessly with a smart phone to act as another display 202 or in place of the display 202 on the user input device 146.

As was noted above, the buttons 150 on the user input device 146 can be used to select an operating mode of the powered two-wheel vehicle 100. As was previously noted, the different operating modes can alter the performance characteristics of the powered two-wheel vehicle to be more suitable for a particular terrain or for a particular rider. Examples of operating modes can include power control modes, damping control modes, and combinations thereof. Power control modes can include a low-power mode, a medium-power mode, and a high-power mode. In the low-power mode, the control system 142 limits current provided to the motor 136 to limit the maximum acceleration of the powered two-wheel vehicle 100 (and consequently, the top speed) which may be more suitable to novice riders. Limiting maximum acceleration also conserves the capacity of the battery 138 to extend the range of the powered two-wheel vehicle 100. In the high-power mode, the control system 142 makes higher current available to the motor 136—in some embodiments, the maximum rated current for the battery 138—for rapid acceleration and higher top speed for the powered two-wheel vehicle 100 that is suitable for more experienced riders. In high-powered mode, the range of the powered two-wheel vehicle 100 can be significantly limited because of the high current drain on the battery 138 to provide increased acceleration to the motor 136. The mid-power mode strikes a balance between the low-power and the high-power modes, limiting current to the motor 136 more than the high-powered mode so that moderate acceleration is available to the powered two-wheel vehicle 100 without significantly reducing the estimated range. The mid-power mode is the default operating mode for the powered two-wheel vehicle 100.

The damping control modes can include a fixed damping mode, a speed-based damping mode, and a user-input or freestyle damping mode that each provide different damping performance of the steering assembly 128 that includes an electro-mechanical rotational damper 204. Any of these damping control modes can be combined with any of the power control modes described above. The buttons 160 on the user input device 146 can be used to select the damping control mode separate from the power control mode, or in conjunction with the power control mode. In fixed damping mode, the damping force provided by the electro-mechanical rotational damper 204 is set to a fixed amount that can be adjusted by the user, similar to a rotational disc friction damper. In the speed-based damping mode, the damping force provided by the electro-mechanical damper 204 increases with the speed of the powered two-wheel vehicle 100. The damping force can increase in a linear relationship to the vehicle speed according to a linear damping profile so that steering is looser and more maneuverable at low speeds and stiff at higher speeds. The damping force can also increase according to a custom damping profile selected and/or edited by the user. In the user-input or manual damping mode, the damping force provided by the electro-mechanical damper 204 varies according to input provided by the user via the user input device 146. The user input device 146 can include a trigger-style input 210 that allows the user to control the amount of damping force. Fully engaging the trigger-style input 210 provides maximum damping force to the steering assembly 128 to lock the position of the front wheel 108. The manual damping mode enables a user to increase damping when cornering and to lock the front wheel 108 position entire when performing freestyle tricks.

Figure 22:
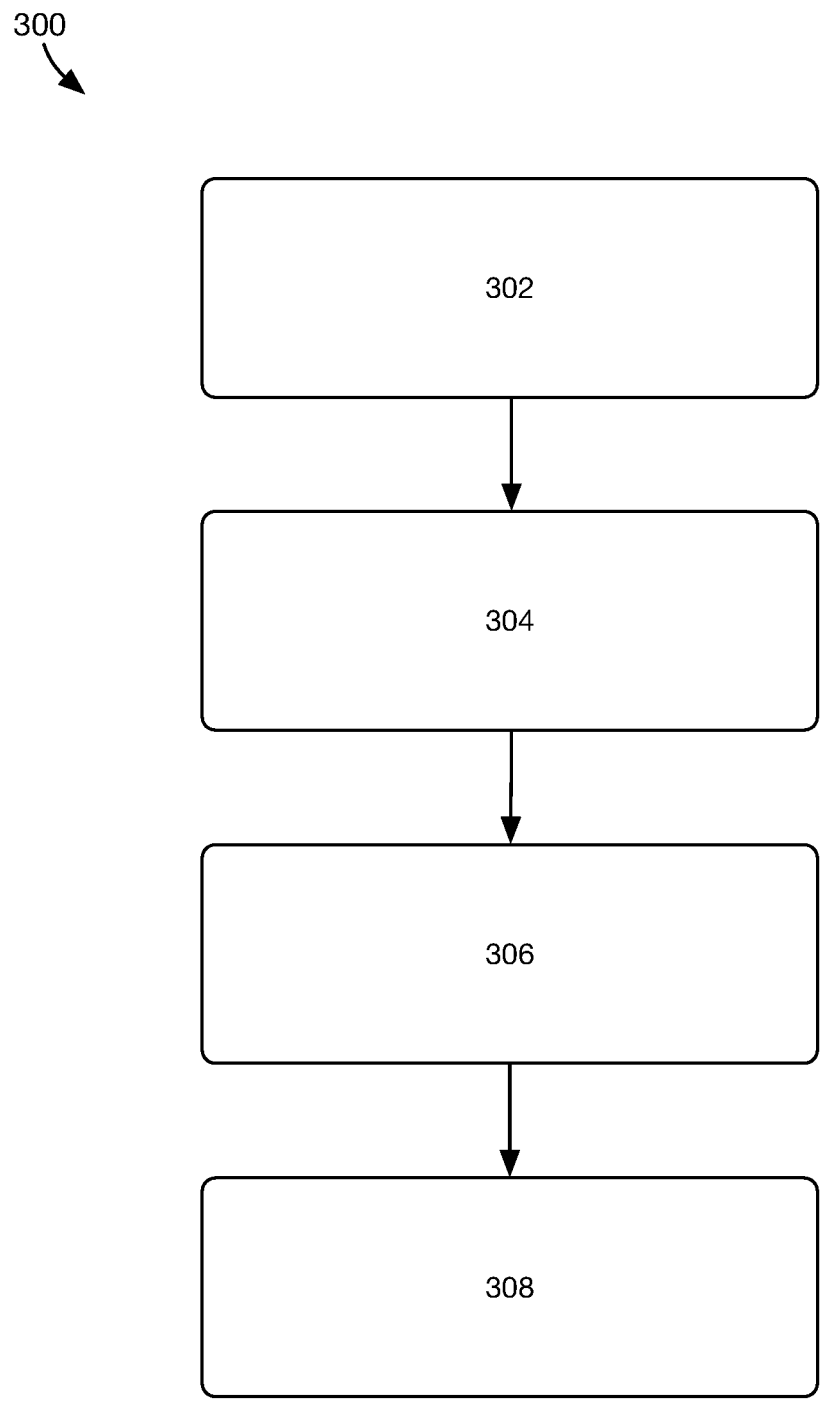
FIG. 22 shows a flow diagram that illustrates an exemplary methodology for controlling a powered two-wheel vehicle.

Referring now to FIG. 22, a methodology 300 that facilitates the control of the powered two-wheel vehicle 100 is shown. The methodology 300 can be performed with any of the powered two-wheel vehicles described herein. The methodology 300 begins at 302 with receiving a user input signal 210 from a user input device 146 at a control system 142. The user input signal 210 includes an acceleration instruction or a deceleration instruction. The control system 142 also receives, at 304, a selected operating mode and at least one of vehicle performance data 216, motor data 220, steering data 222, vehicle status data 224, and sensor data 226. At 306, the control system 142 generates a motor control signal 228 based on: the user input signal 210; at least one of the vehicle performance data 216, motor data 220, steering data 222, vehicle status data 224, and sensor data 226; and the selected operating mode. The motor 136 is operated in response to or according to the motor control signal 228 at 308, for example, to accelerate or to decelerate the powered two-wheel vehicle 100. As is described above, the selected operating mode can be a power control mode that includes a low-power mode, a medium-power mode, and a high-power mode. The steps of controlling the powered two-wheel vehicle 100 can be performed sequentially or simultaneously.

In some exemplary methodologies, the user input signal includes user authentication information, and the methodology includes steps of verifying whether the user is permitted to operate the powered two-wheel vehicle based on the user authentication information, and permitting operation of the powered two-wheel vehicle based on a verification that the user is permitted to operate the powered two-wheel vehicle. The methodology can also include steps of generating a data recording signal, storing the data recording signal in a data storage device, and associating the stored data recording signal with the user of the powered two-wheel vehicle.

Examples of powered two-wheel vehicles and methodologies for controlling the same are described herein.

An example of a powered two-wheel vehicle includes a chassis, a deck, a front wheel, a rear wheel, and a steering assembly. The chassis extends between a rotatable front fork and a fixed rear fork. The deck is removably attached to the chassis, wherein attaching the deck to the chassis encloses a compartment. The front wheel is rotatably attached to the rotatable front fork. The rear wheel is rotatably attached to the fixed rear fork via a hub motor, wherein the hub motor provides motive power to the rear wheel. The steering assembly includes a head tube, a steering tube, and a rotational damper. The head tube is attached to the chassis and supported above and in front of the deck by a pair of arched frame tubes, wherein the head tube is tilted forward at a rake angle. The steering tube is rotatably connected to the head tube, wherein the steering tube extends into the head tube from the rotatable front fork so that the rotatable front fork trails the head tube when the powered two-wheel vehicle moves in a forward direction and the front wheel is in contact with a ground surface. The rotational damper is connected between the head tube and the steering tube.

In an example of a powered two-wheel vehicle, the chassis has two side beams extending between a front bulkhead and a rear bulkhead, and a skid plate extending between the two side beams.

In another example of a powered two-wheel vehicle, the compartment is enclosed by the deck, the two side beams, the front bulkhead, the rear bulkhead, and the skid plate.

In yet another example of a powered two-wheel vehicle, the compartment is water-tight.

In an example of a powered two-wheel vehicle, the rotational damper is a rotational disc damper, and a damping force applied to the steering tube increases in proportion to an angular velocity of the steering tube.

In another example of a powered two-wheel vehicle, the rotational damper is an electro-mechanical damper.

In still another example of a powered two-wheel vehicle, the front wheel and the rear wheel each have a diameter in a range of 5 inches to 17 inches.

In an additional example of a powered two-wheel vehicle, a height of the deck is below a height of a center of each of the front wheel and the rear wheel.

Another powered two-wheel vehicle includes a battery and a control system disposed in the compartment. The battery provides electrical power to the hub motor and the control system. The powered two-wheel vehicle also includes a user input device for transmitting user input signals to the control system. The user input device includes a plurality of control elements for controlling the operation of the powered two-wheel vehicle.

In an example of a powered two-wheel vehicle, actuating one of the plurality of control elements of the user input device in a first direction sends an acceleration instruction to the control system and actuating the control element in a second direction sends a deceleration instruction to the control system. The control system generates a motor control signal based on the acceleration instruction or deceleration instruction and an operating mode of the control system.

In another example of a powered two-wheel vehicle, the operating mode is a power control mode including a low-power mode, a medium-power mode, and a high-power mode.

In an example of a powered two-wheel vehicle, the rotational damper is an electro-mechanical damper and actuating one of the plurality of control elements of the user input device transmits a damping instruction to the control system. The control system generates a damper control signal based on the damping instruction and an operating mode of the control system.

In another example of a powered two-wheel vehicle, the operating mode is a damping control mode including a fixed damping mode, a speed-based damping mode, and a freestyle damping mode.

In still another example of a powered two-wheel vehicle, when the speed-based damping mode is selected, the damper control signal is generated based on at least one of a linear damping profile and a custom damping profile.

In an example of a powered two-wheel vehicle, the rotational damper is a rotational disc damper. A damping force applied to the steering tube increases in proportion to an angular velocity of the steering tube.

In another example of a powered two-wheel vehicle, in response to a deceleration instruction, the motor control signal generated by the control system causes the motor to slow the powered two-wheel vehicle and to charge the battery.

In an example of a powered two-wheel vehicle, actuating one of the plurality of control elements of the user input device changes an operating mode of the powered two-wheel vehicle.

An example method of controlling a powered two-wheel vehicle includes steps of: receiving a user input signal from a user input device at a control system, receiving a selected operating mode and vehicle performance data at the control system, generating a motor control signal, and operating a motor based on the motor control signal. The user input signal includes an acceleration instruction or a deceleration instruction. The motor control signal is generated based on the user input signal, the vehicle performance data, and the selected operating mode.

In another example of a method of controlling a powered two-wheel vehicle, the selected operating mode can be a power control mode that includes a low-power mode, a medium-power mode, and a high-power mode.

As another example of a method of controlling a powered two-wheel vehicle includes steps of: receiving a user input signal from a user input device at a control system; receiving at least one of vehicle performance data, motor data, steering data, vehicle status data, and sensor data at the control system; generating a damping control signal; and adjusting a damping force applied to a steering tube of a steering assembly based on the damping control signal generated by the control system. The damping control signal is generated by the control system based on: the user input signal; at least one of the vehicle performance data, motor data, steering data, vehicle status data, and sensor data; and a custom performance profile.

In another example of a method of controlling a powered two-wheel vehicle, the user input signal comprises user authentication information and the methodology includes steps of verifying whether the user is permitted to operate the powered two-wheel vehicle based on the user authentication information and permitting operation of the powered two-wheel vehicle based on a verification that the user is permitted to operate the powered two-wheel vehicle.

In still another example of a method of controlling a powered two-wheel vehicle, the method includes steps of: generating a data recording signal; storing the data recording signal in a data storage device; and associating the stored data recording signal with the user of the powered two-wheel vehicle.

In an example of a method of controlling a powered two-wheel vehicle, generating the damping control signal is also based on an operating mode of the control system, and the operating mode is at least one of a power control mode and a damping control mode.

In another example of a method of controlling a powered two-wheel vehicle, the power control mode can be a low-power mode, a medium-power mode, and a high-power mode.

In yet another example of a method of controlling a powered two-wheel vehicle, the damping control mode is a fixed damping mode, a speed-controlled damping mode, and a user-input damping mode.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed:

1. A powered two-wheel vehicle comprising:
    a chassis extending between a rotatable front fork and a fixed rear fork;
    a deck removably attached to the chassis, wherein attaching the deck to the chassis encloses a compartment;
    a front wheel rotatably attached to the rotatable front fork;
    a rear wheel rotatably attached to the fixed rear fork via a hub motor, wherein the hub motor provides motive power to the rear wheel;
    a steering assembly comprising:
        a head tube attached to the chassis and supported above and in front of the deck by a pair of arched frame tubes, wherein the head tube is tilted forward at a rake angle;
        a steering tube rotatably connected to the head tube, wherein the steering tube extends into the head tube from the rotatable front fork so that the rotatable front fork trails the head tube when the powered two-wheel vehicle moves in a forward direction and the front wheel is in contact with a ground surface; and
        a rotational damper connected between the head tube and the steering tube.

2. The powered two-wheel vehicle of claim 1, wherein the rotational damper is a rotational disc damper, and wherein a damping force applied to the steering tube increases in proportion to an angular velocity of the steering tube.

3. The powered two-wheel vehicle of claim 1, wherein the rotational damper is rotational disc damper.

4. The powered two-wheel vehicle of claim 1, wherein:
the chassis comprises two side beams extending between a front bulkhead and a rear bulkhead, and a bottom plate extending between the two side beams; and
the compartment is enclosed by the deck, the two side beams, the front bulkhead, the rear bulkhead, and the bottom plate.

5. The powered two-wheel vehicle of claim 1, wherein a height of the deck is below a height of a center of each of the front wheel and the rear wheel.

6. A powered two-wheel vehicle comprising:
a chassis extending between a rotatable front fork and a fixed rear fork;
a deck removably attached to the chassis, wherein attaching the deck to the chassis encloses a compartment;
a front wheel rotatably attached to the rotatable front fork;
a rear wheel rotatably attached to the fixed rear fork via a hub motor, wherein the hub motor provides motive power to the rear wheel;
a steering assembly comprising:
  a head tube attached to the chassis and supported above and in front of the deck by a pair of arched frame tubes, wherein the head tube is tilted forward at a rake angle;
  a steering tube rotatably connected to the head tube, wherein the steering tube extends into the head tube from the rotatable front fork so that the rotatable front fork trails the head tube when the powered two-wheel vehicle moves in a forward direction and the front wheel is in contact with a ground surface; and
  a rotational damper connected between the head tube and the steering tube;
a battery and a control system disposed in the compartment, wherein the battery provides electrical power to the hub motor and the control system; and
a user input device for transmitting user input signals to the control system, wherein the user input device comprises a plurality of control elements for controlling the operation of the powered two-wheel vehicle.

7. The powered two-wheel vehicle of claim 6, wherein actuating one of the plurality of control elements of the user input device in a first direction sends an acceleration instruction to the control system and actuating the control element in a second direction sends a deceleration instruction to the control system, and wherein the control system generates a motor control signal based on the acceleration instruction or deceleration instruction and an operating mode of the control system.

8. The powered two-wheel vehicle of claim 7, wherein motor control signal generated by the control system is also based on vehicle performance data received by the control system.

9. The powered two-wheel vehicle of claim 8, wherein the wherein the vehicle performance data comprises a current speed of the powered two-wheel vehicle.

10. The powered two-wheel vehicle of claim 6, wherein the operating mode is a power control mode comprising a low-power mode, a medium-power mode, and a high-power mode.

11. The powered two-wheel vehicle of claim 6, wherein the operating mode of the control system is selected via the user input device.

12. The powered two-wheel vehicle of claim 6, wherein the rotational damper is a rotational disc damper, and wherein a damping force applied to the steering tube increases in proportion to an angular velocity of the steering tube.

13. The powered two-wheel vehicle of claim 7, wherein in response to a deceleration instruction, the motor control signal generated by the control system causes the motor to slow the powered two-wheel vehicle and to charge the battery.

14. The powered two-wheel vehicle of claim 6, wherein actuating one of the plurality of control elements of the user input device changes an operating mode of the powered two-wheel vehicle.

15. The powered two-wheel vehicle of claim 6, wherein:
the chassis comprises two side beams extending between a front bulkhead and a rear bulkhead, and a bottom plate extending between the two side beams; and
the compartment is enclosed by the deck, the two side beams, the front bulkhead, the rear bulkhead, and the bottom plate.

16. A method of controlling a powered two-wheel vehicle, the method comprising:
receiving a user input signal from a user input device at a control system, wherein the user input signal comprises an acceleration instruction or a deceleration instruction;
receiving a selected operating mode and vehicle performance data at the control system;
generating with the control system a motor control signal based on the user input signal, the vehicle performance data, and the selected operating mode; and
operating a motor in response to the motor control signal.

17. The method of claim 16, wherein the user input signal comprises user authentication information, and the method further comprises:
verifying whether the user is permitted to operate the powered two-wheel vehicle based on the user authentication information;
permitting operation of the powered two-wheel vehicle based on a verification that the user is permitted to operate the powered two-wheel vehicle.

18. The method of claim 16, further comprising:
generating a data recording signal;
storing the data recording signal in a data storage device; and
associating the stored data recording signal with the user of the powered two-wheel vehicle.

19. The method of claim 16, wherein the selected operating mode is one of a low-power mode, a medium-power mode, and a high-power mode.

20. The method of claim 16, wherein the vehicle performance data comprises a current speed of the powered two-wheel vehicle.

* * * * *